(12) United States Patent
Garrity et al.

(10) Patent No.: US 11,994,611 B2
(45) Date of Patent: May 28, 2024

(54) FREQUENCY AND TIME OFFSET MODULATION (FANTOM) CHIRP MIMO AUTOMOTIVE RADAR WITH N-PATH NOTCH FILTER

(71) Applicant: NXP B.V., Eindhoven (NL)

(72) Inventors: Douglas Alan Garrity, Gilbert, AZ (US); Ryan Haoyun Wu, San Jose, CA (US); Maik Brett, Taufkirchen (DE)

(73) Assignee: NXP B.V., Eindhoven (NL)

( * ) Notice: Subject to any disclaimer, the term of this patent is extended or adjusted under 35 U.S.C. 154(b) by 440 days.

(21) Appl. No.: 17/491,596

(22) Filed: Oct. 1, 2021

(65) Prior Publication Data

US 2023/0128469 A1    Apr. 27, 2023

(51) Int. Cl.
  *G01S 7/292* (2006.01)
  *G01S 7/35* (2006.01)

(52) U.S. Cl.
  CPC .............. *G01S 7/292* (2013.01); *G01S 7/354* (2013.01)

(58) Field of Classification Search
  CPC ................................. G01S 7/292; G01S 7/354
  See application file for complete search history.

(56) References Cited

U.S. PATENT DOCUMENTS

| | | | |
|---|---|---|---|
| 6,020,783 A | 2/2000 | Coppola | |
| 9,414,126 B1* | 8/2016 | Zinevich | H04B 3/46 |
| 9,448,302 B2 | 9/2016 | Schoor et al. | |
| 9,541,638 B2* | 1/2017 | Jansen | G01S 13/878 |
| 11,681,017 B2* | 6/2023 | Behrens | G01S 7/40 |
| | | | 342/86 |
| 2009/0303108 A1* | 12/2009 | Hilsebecher | G01S 13/345 |
| | | | 342/157 |
| 2020/0233076 A1 | 7/2020 | Chen et al. | |

FOREIGN PATENT DOCUMENTS

EP    3835810 A1    6/2021

OTHER PUBLICATIONS

Amir Ghaffari et al, Tunable N-Path Notch Filters for Blocker Suppression: Modeling and Verification, IEEE Journal of Solid-State Circuits, vol. 48, No. 6, pp. 1370-1382, Jun. 2013.

(Continued)

*Primary Examiner* — Peter M Bythrow
*Assistant Examiner* — Nazra Nur Waheed

(57) ABSTRACT

A radar system, apparatus, architecture, and method are provided with a transmitter that produces a plurality of distinct FanTOM signals that are transmitted as N RF-encoded transmit signals in an overlapped fashion such that the pulse repetition interval and frame length are kept short; a receiver that processes target return signals reflected from the N RF-encoded transmit signals with a mixer to produce an IF signal which is filtered with one or more notch filters clocked with a sampling clock frequency to control harmonic notch frequencies to suppress transmitter spill-over and close-in self-clutter interference, thereby producing a filtered IF signal that is converted to a digital signal with an analog-to-digital converter that is clocked with the sampling clock frequency; and a radar processor that processes the digital signal to generate a range spectrum comprising N segments that correspond, respectively, to the N RF-encoded transmit signals.

20 Claims, 20 Drawing Sheets

(56) References Cited

OTHER PUBLICATIONS

Johannes Fink et al, Comparison of OFDM radar and chirp sequence radar, 2015 16th International Radar Symposium (IRS), Dresden, 2015, pp. 315-320.

Eric A.M. Klumperink et al., N-Path Filters and Mixer-First Receivers: A Review, 2017 IEEE Custom Integrated Circuits Conference (CICC), Apr. 30-May 3, 2017.

* cited by examiner

1300A

Vin INPUT SIGNAL PHASE (Np=8 example)

INPUT
1301

SWITCH
CLOCKING 1302

N-PATH NOTCH FILTER
(SINGLE ENDED) 1303

TUNABLE NOTCH FILTER OUTPUT
(ADJUSTING $f_{clk} = 1/T_p$) 1304

FUNDAMENTAL NOTCH
RESPONSE 1305

EQUIVALENT
RLC FILTER 1306

1300C

HARMONIC NOTCH RESPONSE 1307

INPUT
1401

SWITCH
CLOCKING 1402

N-PATH NOTCH FILTER
(FULLY DIFFERENTIAL) 1403

TUNABLE NOTCH FILTER OUTPUT
(ADJUSTING $f_{clk} = 1/T_p$) 1404

1400C

FUNDAMENTAL NOTCH
RESPONSE 1405

EQUIVALENT RLC FILTER 1406

1400D

HARMONIC NOTCH RESPONSE 1407

FREQUENCY AND TIME OFFSET MODULATION (FANTOM) CHIRP MIMO AUTOMOTIVE RADAR WITH N-PATH NOTCH FILTER

BACKGROUND OF THE INVENTION

Field of the Invention

This disclosure relates generally to radar systems and associated methods of operation, and more specifically, to a frequency and time offset modulation approach to radar systems to provide a very large multiple-input, multiple-output (MIMO) array formation.

Description of the Related Art

Radar systems are used to detect the range, velocity, and angle of nearby targets. With advances in technology, radar systems can now be applied in many different applications, such as automotive radar safety systems, but not every radar system is suitable for every application. For example, 77 GHz Frequency Modulation Continuous Wave (FMCW) Fast Chirp Modulation (FCM) radars are used with MIMO arrays as sensors in Advanced Driver Assistance System (ADAS) and autonomous driving (AD) systems. Since the number of virtual antennas constructed with the MIMO approach (which equals the product of the number of physical transmit and receiver antenna elements) is larger than the total number of physical elements, the resulting MIMO array can form a larger aperture than the physical elements alone, resulting in improved angular resolution. However, MIMO systems can have difficulty distinguishing between Linear Frequency Modulation (LFM) waveforms transmitted by different transmit antennas.

Existing radar systems have attempted to address these challenges by using time-division (TD) multiplexing techniques to separate LFM waveforms from different transmitters in time, thereby separating signals originated from distinct transmitters at each receiving channel for constructing a virtual MIMO array. But because conventional TD-MIMO systems suffer from the limitation of range migration, only a small number of transmitters (e.g., 3) can be employed which allows a relatively small MIMO virtual array to be constructed. As a result, the size of virtual array is limited which leads to insufficient angular resolution for many advanced ADAS and autonomous driving applications. Thus, existing radar system solutions are extremely difficult at a practical level due to challenges with achieving the performance benefits of larger size radars within the performance, design, complexity and cost constraints of existing radar system applications.

BRIEF DESCRIPTION OF THE DRAWINGS

The present invention may be understood, and its numerous objects, features and advantages obtained, when the following detailed description is considered in conjunction with the following drawings.

The use of the same reference symbols in different drawings indicates identical items unless otherwise noted. The figures are not necessarily drawn to scale.

DETAILED DESCRIPTION

Figure 1:
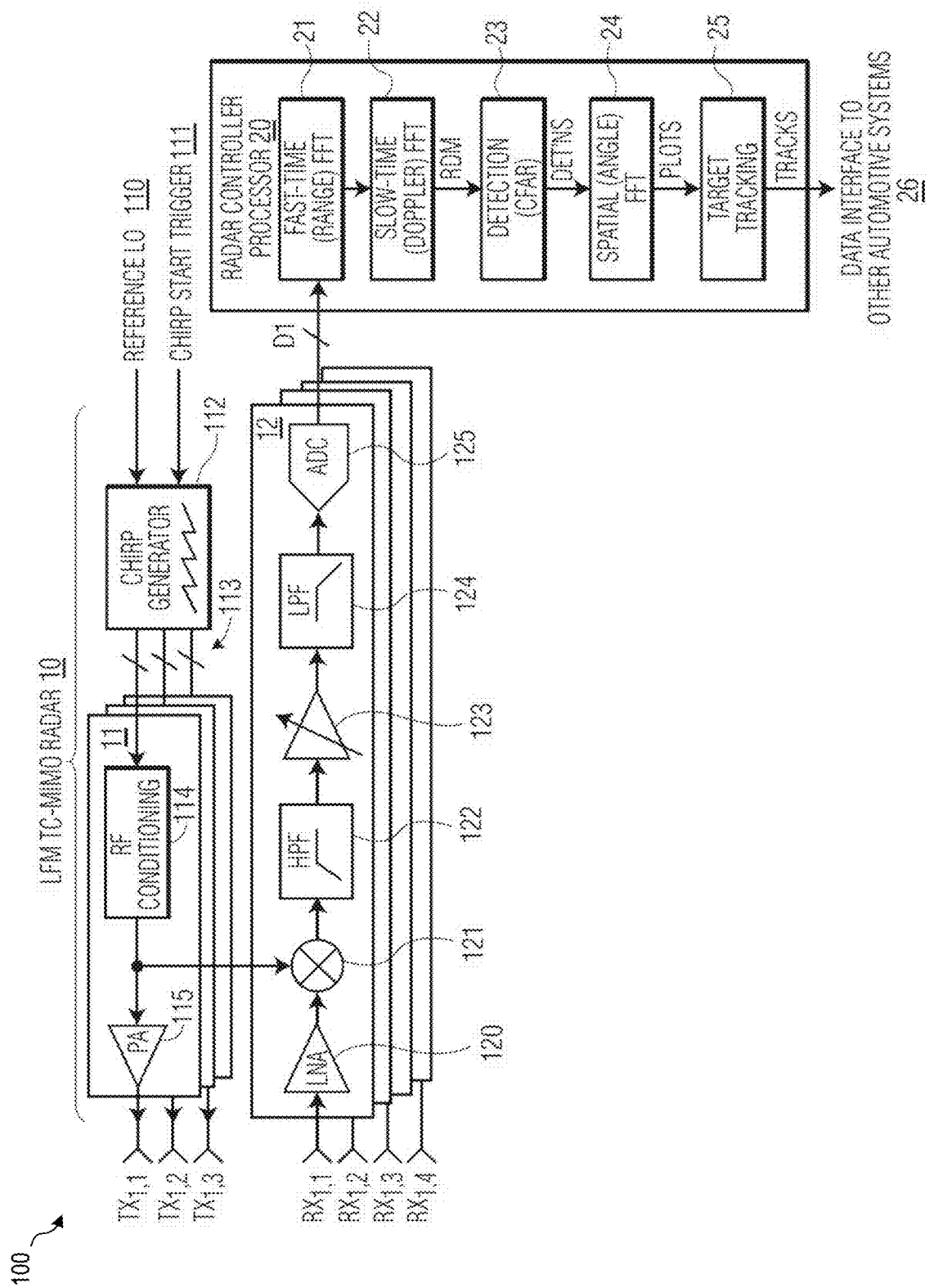
FIG. 1 which depicts a simplified schematic block diagram of a conventional LFM TD-MIMO automotive radar system which includes an LFM TD-MIMO radar device connected to a radar controller processor.

A frequency and time offset modulation (FanTOM) MIMO radar system, hardware circuit, system, architecture, and methodology are described for constructing very large MIMO virtual arrays by using configurable N-path notch filters in the receiver modules to disambiguate distinct linear chirp signals which are transmitted by multiple transmitter channels in a heavily overlapped fashion, with each transmitter sending delayed versions of the first chirp signal such that the chirp signals from differing transmitters can be separated on reception in the range spectrum domain to enable construction of large MIMO virtual arrays. By sending distinct chirps as time-delayed versions of a first reference chirp signal using small delays, the chirps overlap in the fast-time domain, but the short time delay results in short pulse repetition intervals and frames, thereby alleviating range migration issues while achieving a high frame update rate. But by controlling the delay to be at least the instrument round-trip delay, the small delay provides sufficient separation in the range spectrum domain to enable separation of the transmitters. Further, because the chirps sweep the same frequency range, the wavelengths are identical across transmitters such that there is no residual-range versus angle ambiguity issue present in the frequency-offset modulation range division MIMO system. To assist with disambiguation of the linear chirp transmit signals, each receiver mixes a target return signal with a reference chirp signal to generate an intermediate frequency signal which is filtered by a bank of configurable notch filters to suppress transmitter spill over at multiple specified frequencies, thereby reducing or eliminating close-in self-clutter interference and equalizing the range response so that dynamic range requirement of the analog-to-digital converter is reduced. By implementing the configurable notch filters with at least a first bank of switched capacitors and resistors, the filter notches may be controlled by the switching frequency while the notch bandwidth may be controlled by the number and size of the capacitors and resistors used.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified schematic circuit block diagrams without including every circuit element or detail in order to avoid limiting or obscuring the present invention. Such descriptions and representations are used by those skilled in the art to describe and convey the substance of their work to others skilled in the art. It is also noted that, throughout this detailed description, certain elements in the figures are illustrated for simplicity and clarity and have not necessarily been drawn to illustrate specific details. Furthermore, the described features, advantages, and characteristics of the invention may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments. For example, selected aspects are depicted with reference to simplified circuit schematic drawings without including every circuit detail in order to avoid limiting or obscuring the present invention. Such details are well known and not considered necessary to teach one skilled in the art of how to make or use the present invention.

In the context of the present disclosure, it will be appreciated that radar systems may be used as sensors in a variety of different applications, including but not limited to automotive radar sensors for road safety systems, such as advanced driver-assistance systems (ADAS) and autonomous driving (AD) systems. In such applications, the radar systems are used to measure radial distance to a reflecting object, its relative radial velocity, and angle information, and are characterized by performance criteria, such as the angular resolution (the minimum distance between two equal large targets at the same range and range rate (or radial velocity) resolution cell which a radar is able to distinguish and separate to each other), sensitivity, false detection rate, and the like. Typically, frequency modulated continuous wave (FMCW) modulation radars are used to identify the distance, velocity, and/or angle of a radar target, such as a car or pedestrian, by transmitting Linear Frequency Modulation (LFM) waveforms from multiple transmit antennas so that reflected signals from the radar target are received at multiple receive antennas and processed to determine the radial distance, relative radial velocity, and angle (or direction) for the radar target. However, with current automotive designs, a vehicle can include multiple radar transmitters that operate independently from one another. As a result, the LFM waveform transceivers may be configured to implement time-division (TD) MIMO operations to temporally separate signals originated from distinct transmitters so that a receiving channel can distinctly detect each signal and thereby construct a virtual MIMO array. Alternatively, the LFM waveform transceivers may be configured to implement frequency-offset modulation (FOM) range division MIMO system where each transmit channel transmits chirps at a different central frequency to enable a receiving channel to distinctly detect each signal from distinct transmitters so that a virtual MIMO array can be constructed.

To illustrate the design and operation of a conventional TD MIMO radar system, reference is now made to FIG. 1 which depicts a simplified schematic block diagram of a conventional LFM TD-MIMO automotive radar system 100 which includes an LFM radar device 10 connected to a radar controller processor 20. In selected embodiments, the LFM TD-MIMO radar device 10 may be embodied as a line-replaceable unit (LRU) or modular component that is designed to be replaced quickly at an operating location. Similarly, the radar controller processor 20 may be embodied as a line-replaceable unit (LRU) or modular component. Although a single or mono-static LFM TD-MIMO radar device 10 is shown, it will be appreciated that additional distributed radar devices may be used to form a distributed or multi-static radar. In addition, the depicted radar system 100 may be implemented in integrated circuit form with the LFM TD-MIMO radar device 10 and the radar controller processor 20 formed with separate integrated circuits (chips) or with a single chip, depending on the application.

Each radar device 10 includes one or more transmitting antenna elements TX, and receiving antenna elements $RX_j$ connected, respectively, to one or more radio-frequency (RF) transmitter (TX) units 11 and receiver (RX) units 12. For example, each radar device (e.g., 10) is shown as including individual antenna elements (e.g., $TX_{1,j}$, $RX_{1,j}$) connected, respectively, to three transmitter modules (e.g., 11) and four receiver modules (e.g., 12), but these numbers are not limiting and other numbers are also possible, such as four transmitter modules 11 and six receiver modules 12, or a single transmitter module 11 and/or a single receiver modules 12. Each radar device 10 also includes a chirp generator 112 which is configured and connected to supply a chirp input signal to the transmitter modules 11. To this end, the chirp generator 112 is connected to receive a separate and independent local oscillator (LO) signal 110 and a chirp start trigger signal 111, though delays are likely to be different due to the signal path differences and programmable digital delay elements in the signal paths. Chirp signals 113 are generated and transmitted to multiple transmitters 11, usually following a pre-defined transmission schedule, where they are filtered at the RF conditioning module 114 and amplified at the power amplifier 115 before being fed to the corresponding transmit antenna $TX_{1,i}$ and radiated. By sequentially using each transmit antenna $TX_{1,i}$, to transmit successive pulses in the chirp signal 113, each transmitter element 11 operates in a time-multiplexed fashion in relation to other transmitter elements because they are programmed to transmit identical waveforms on a temporally separated schedule.

The radar signal transmitted by the transmitter antenna unit $TX_{1,i}$, $TX_{2,i}$ may be reflected by an object, and part of the reflected radar signal reaches the receiver antenna units $RX_{1,j}$ at the radar device 10. At each receiver module 12, the received (radio frequency) antenna signal is amplified by a low noise amplifier (LNA) 120 and then fed to a mixer 121 where it is mixed with the transmitted chirp signal generated by the RF conditioning unit 113. The resulting intermediate frequency signal is fed to a first high-pass filter (HPF) 122. The resulting filtered signal is fed to a first variable gain amplifier 123 which amplifies the signal before feeding it to a first low pass filter (LPF) 124. This re-filtered signal is fed to an analog/digital converter (ADC) 125 and is output by each receiver module 12 as a digital signal D1. The receiver module 12 compresses target echo of various delays into multiple sinusoidal tones whose frequencies correspond to the round-trip delay of the echo.

The radar system 100 also includes a radar controller processing unit 20 that is connected to supply input control signals to the radar device 10 and to receive therefrom digital output signals D1 generated by the receiver modules 12. In selected embodiments, the radar controller processing unit 20 may be embodied as a micro-controller unit (MCU) or other processing unit that is configured and arranged for signal processing tasks such as, but not limited to, target identification, computation of target distance, target velocity, and target direction, and generating control signals. The radar controller processing unit 20 may, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences. In addition, the radar controller processor 20 may be configured to program the modules 11, 12 to operate in a time-division fashion by sequentially transmitting LFM chirps for coordinated communication between the transmit antennas $TX_{1,i}$, $RX_{1,j}$. The result of the digital processing at the radar controller processing unit 20 is that the digital domain signals D1 are processed for the subsequent fast-time range FFT 21, slow-time Doppler FFT 22, constant false alarm rate (CFAR) target detection 23, spatial angle estimation 24, and target tracking processes 25, with the result being output 26 to other automotive computing or user interfacing devices for further process or display.

Figure 2:
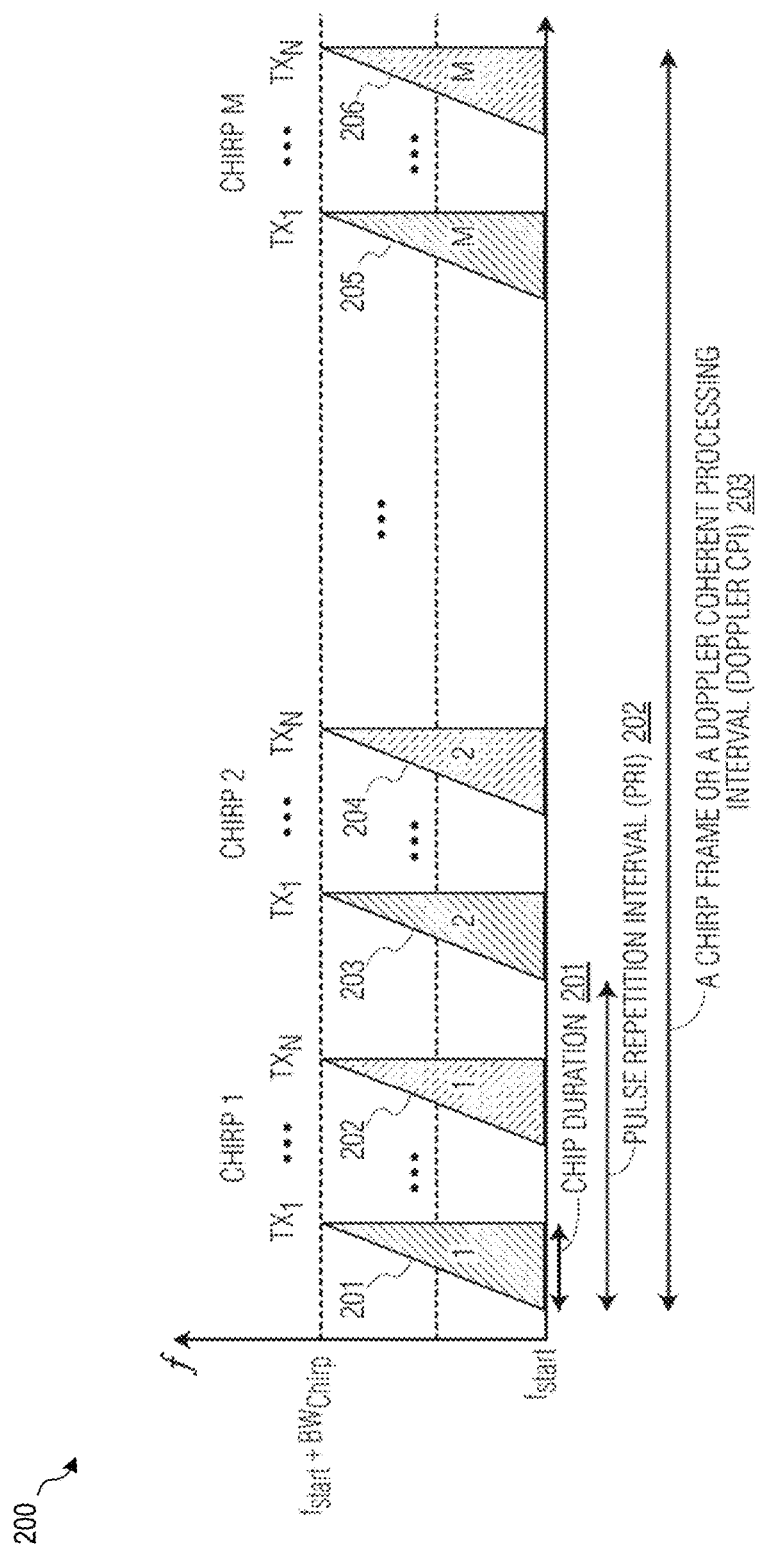
FIG. 2 which depicts a timing diagram illustration of a chirp transmission schedule for an LFM TD-MIMO automotive radar system.

To illustrate an example of time division transmission of radar transmit signals, reference is now made to FIG. 2 which depicts a timing diagram illustration 200 of a chirp transmission schedule for an LFM TD-MIMO automotive radar system. As depicted, each transmitter (e.g., $TX_1$, etc.) is programmed to take turns transmitting one chirp (e.g., 201) of a sequence of chirps 201-206. This temporal separation of chirp transmission by each transmit antenna allows the separation of transmitters at the receiving end by simply associating the received signal with the scheduled transmitter. The ability to separate transmitters in the received signal is a prerequisite of the MIMO radar approach, which is routinely used in automotive radars for constructing a virtually large antenna array aperture compared to the physical aperture of the transmit and receive antennas. The larger aperture constructed virtually via MIMO provides better angular resolution performance which is required by many advanced driver assistance system (ADAS) and autonomous driving (AD) applications. The use of a transmitter schedule to divide the time-domain resources amongst the transmitters when forming a virtual MIMO array is referred to as a time division (TD) MIMO approach.

Since the TD-MIMO approach provides a relatively straightforward way to separate transmitters with little or no leakage, it is routinely used in automotive radar applications. However, the requirement of dividing time between resources means that a much longer frame duration is required to complete the transmission of all chirps for each transmitter. If the prolonged frame duration is longer than the duration a target stays within a single range resolution cell, any range migration by the target can degrade the subsequent digital Doppler coherent integration processing and angle estimation, thereby adversely impacting measurement performance.

Another drawback with conventional TD-MIMO approaches is the increase in the duration of the pulse repetition intervals (PRI) between adjacent pulses of the same transmitter. In particular, with each transmitter (e.g., $TX_1$-$TX_N$) being scheduled to take its turn to transmit their first pulses (e.g., 201-202) before beginning the sequential transmission of the second pulses (e.g., 203-204), and so on until the last pulses (e.g., 205-206) are transmitted, the pulse repetition interval (PRI) 202 between two adjacent pulses of the same transmitter is also prolonged. Because the maximum unambiguous Doppler shift measurable by the chirp sequence is inversely related to the PRI, a lengthened PRI results in reduced maximum unambiguous Doppler performance. As a result, the maximum number of transmitters that can be used for TD-MIMO operation is limited. For typical road use, up to 3 transmitters may be used for TD MIMO without unacceptable performance degradation. This, in turn limits the size of the MIMO virtual array.

Embodiments of the present invention overcome the limitations of traditional TD-MIMO approaches by introducing a new frequency and time offset modulation (FanTOM) approach to the Linear Frequency Modulation (LFM) automotive radar. This enables larger MIMO array constructions than those traditionally available. One aspect of the FanTOM approach is a frequency and time offset modulation chirp waveform that enables signals transmitted from distinct transmitters to be separable in a range spectrum at each receive channel. The degree of range separation corresponds to the amount of time offset imposed on each transmitter. The time offset nominally should be at least the amount of the maximum round-trip target delay observable by the system (e.g., 2 µs in typical automotive applications). A corresponding frequency offset is applied to each transmit channel such that all chirps are transmitted with an identical start frequency and identical stop frequency. The effect of the frequency and time offset is equivalent to transmitting distinctly delayed chirps at different transmit channels.

During reception, each receive channel mixes the received RF signal with a reference chirp that starts with the first chirp of the group and ends when the echo from the last chirp of the group arrives at the receivers (e.g., 2 μs after the end of transmission of the last chirp of the group). In one example embodiment, as will be discussed in greater detail below, the starting frequency of the reference chirp is the same as the start frequency of the first chirp and the slope of the reference chirp is the same as that of all the chirps. Each receive channel uses the same reference chirp for mixing purposes.

Each receive channel starts digital acquisition which begins at the start of the earliest chirp transmission and ends when an echo from the last chirp of every transmitter arrives at the receivers (e.g., 2 μs after completion of the transmission of the last chirp of the group). The speed of an ADC associated with the receivers should be sufficiently fast to describe unambiguously the IF frequency of the most distant targets echoed from the last chirp. As an example, for a most distant target at a range Rmax [m] illuminated by a linear chirp with a slope of S [MHz/s] transmitted by K transmitters in the FanTOM fashion, the maximum IF frequency (IFmax) to be described will be:

$$IFmax = K*S*(R\max*2)/c = K*S*\Delta t = K*\Delta f \text{ [MHz]},$$

where c is the speed of light [m/s] and the sampling rate of the ADC (Fs) is at least twice IFmax. In practice, the sampling rate should be significantly greater than 2*IFmax in order to allow pre-ADC analog anti-alias filtering and post-ADC digital filtering. From the above equation, it can be seen that $(R\max*2)/c = \Delta t$ and $S*\Delta t = \Delta f$, where $\Delta t$ is the offset time between transmit channels (e.g., when the power amplifier associated with each transmit channel is in an ON state), and $\Delta f$ is the amount of frequency offset between transmit channels. Thus, for up-chirps, the frequency offset is $-\Delta f$, while for down-chirps, the frequency offset is $\Delta f$.

Figure 3:
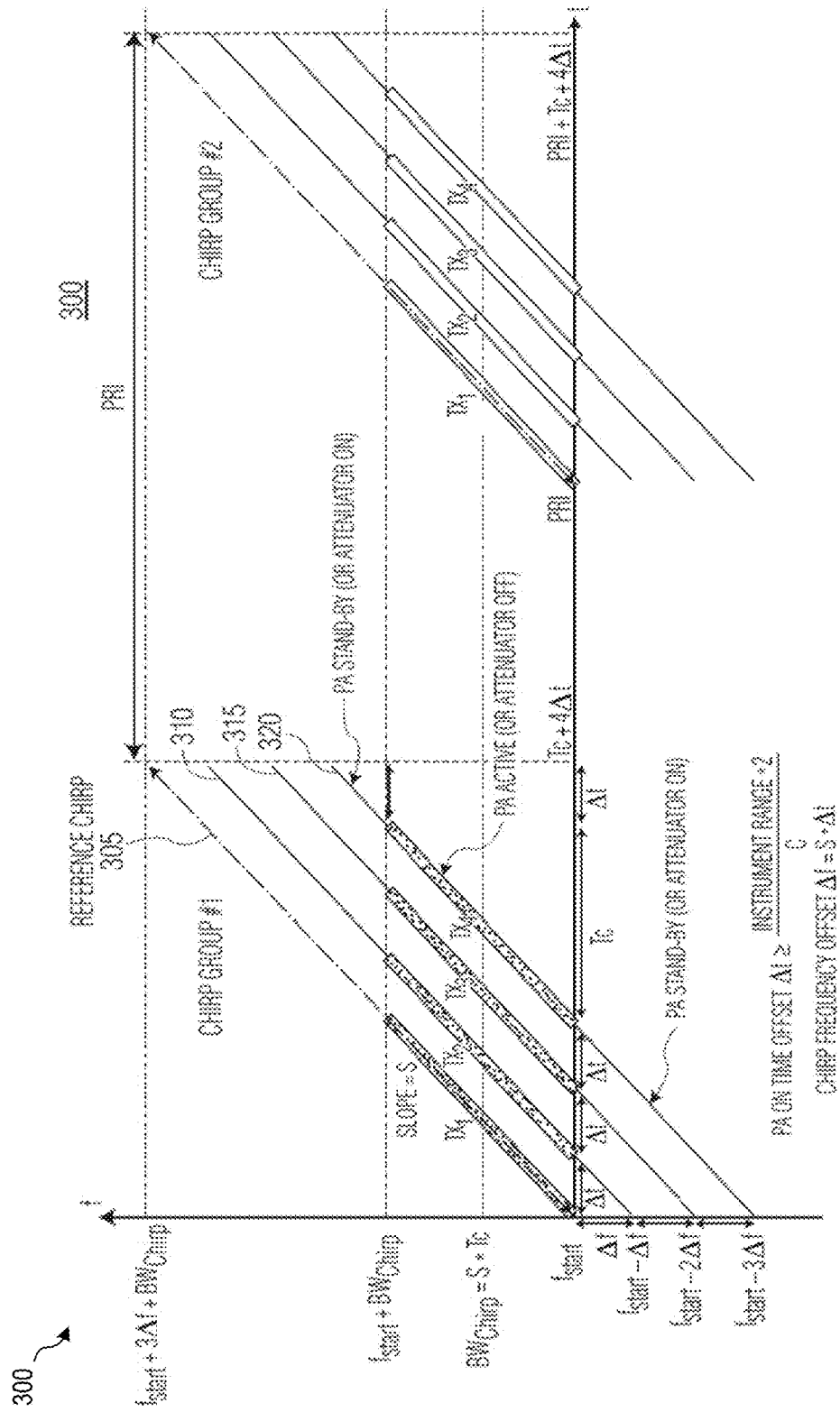
FIG. 3 is a graph illustrating a frequency plan of an exemplary four-transmit channel frequency and time offset modulation (FanTOM) chirp system in accordance with selected embodiments of the present disclosure.

For an improved understanding of how reference chirp signals are used in a FanTOM chirp MIMO radar system, reference is now made to FIG. 3 which depicts a graph illustrating a frequency plan 300 of an exemplary four-transmit channel FanTOM chirp system in accordance with embodiments of the present invention. As depicted, a reference chirp 305 begins at a time zero (t=0) zero and ends at a time t=Tc+4Δt. In addition, the reference chirp 305 starts at a starting frequency $f_{start}$ and ends at an ending frequency $f_{start}+BW_{chirp}+3\Delta f$, where $BW_{chirp}$ is the chirp bandwidth and $BW_{chirp}=S*Tc$, wherein Tc is the chirp transmit duration. In the example four-transmit channel FanTOM chirp system, a first transmitter $TX_1$ is excited with the first reference chirp 305, but only transmits the chirp for a chirp duration of Tc starting from time zero, which is relative to the start of a frame. The transmit duration can be controlled by switching a power amplifier from and to a standby mode. In similar fashion, a second transmitter $TX_2$ is excited by a second reference chirp 310 which is a frequency offset version of the first reference chirp 305, where the amount of frequency offset is $-\Delta f$, as illustrated in FIG. 3. In addition, the ON time of the second transmitter $TX_2$ power amplifier is similarly offset by an amount of Δt and remains ON for the chirp duration Tc. The offset frequency is controlled such that $\Delta f=S*\Delta t$, where S is the slope of the linear chirp. The combined effect of Δf and Δt is that the second reference chirp signal 310 transmitted by the second transmitter $TX_2$ is a delayed version of the first chirp signal 305 transmitted by the first transmitter $TX_1$, as illustrated in FIG. 3. The duration of the power amplifier ON offset Δt is at least the amount of round-trip delay equivalent to the desired range of the radar system. In a similar fashion, a third transmitter $TX_3$ transmits a third reference chirp signal 315 which is a delayed version of the first reference chirp 305 that is delayed by 2Δt. This can be achieved by applying a frequency offset of 2Δf to the first reference chirp 305 and an ON offset of 2Δt to the power amplifier for the third transmitter $TX_3$ which remains in an ON state for the chirp duration of Tc. Likewise, a fourth transmitter $TX_4$ transmits a fourth reference chirp signal 320 that is a delayed version of the first reference chirp signal 305 delayed by 3Δt following a similar procedure. This group of chirps are repeatedly transmitted at a pulse repetition interval (PRI) duration for M times until the end of the frame.

In practice, the power amplifier ON/OFF function controls the radiation time of the transmitted reference chirp signal(s). This can be achieved, for example, by having each transmitter include an RF switch circuit connecting the input signal to an active power amplifier. By closing the RF switch circuit, the signal is input to the active power amplifier, which then outputs an amplified signal for radiation by an antenna. By opening the RF switch circuit, no signal is input to the active power amplifier and an amplified signal is not amplified nor radiated. As an alternative example, an RF switch circuit can connect the output of the power amplifier to the input of an antenna. When the RF switch circuit is closed, an amplified signal from the power amplifier is provided to the antenna for radiation. When the RF switch circuit is open, the amplified signal is not radiated by the antenna.

During receive processing of the target return signal, each receiver mixes the RF target return signal received at an antenna with the reference chirp, and then conditions the mixed signal with an anti-aliasing filter, n-path filter, and an additional low-pass filter in the receive signal processing path. The filtered signal is sampled by an analog-to-digital converter (ADC) for the entire duration from chirp start (e.g., t=0 for the first group, and t=(m−1)*PRI for group m) and continuing for a duration of no less than Tc+4Δt. The ADC should provide a minimum sample count Ns=ceil{(Tc+4Δt)*Fs}, where Fs is the ADC sampling rate and ceil{.} is a round-up operation. In the exemplary four-transmit channel FanTOM chirp system, the maximum IF frequency is 4Δf, resulting in a sampling rate of the ADC being at least twice the maximum IF frequency to meet the Nyquist criteria. In addition, in order to reduce the area (e.g., cost) and power of anti-alias filter, the ADC sample rate should be significantly higher than the Nyquist rate (e.g., at least four times the maximum IF frequency). The output of ADC from each receive channel is the raw data of the radar which may be processed by a digital filter that decimates (i.e., divides) the ADC output to lower the final desired output rate which is the number of transmitters N times the offset frequency Δf times 2. As will be appreciated, the digital filter could be implemented as part of the ADC or as part of the signal processing that occurs in the radar MCU Next, the spectrum of the raw ADC samples is processed by radar processor, such as by using a fast Fourier transform engine to extract the target range information. The radar processor can perform a variety of tasks in extracting the target range information. For example, the radar processor can extract the range spectrum of each of the N transmitters from a range spectrum of the N radio frequency encoded transmit signals to form a Doppler spectrum for each range spectrum (over multiple transmit cycles). In addition, the radar processor can perform detection of the target return signal in each Doppler spectrum transmitter/receiver pair by forming a range-division MIMO virtual antenna measurement vector from the detected target return signals, and then generate a target angle using the formed range-division MIMO virtual antenna measurement vectors.

Figure 4:
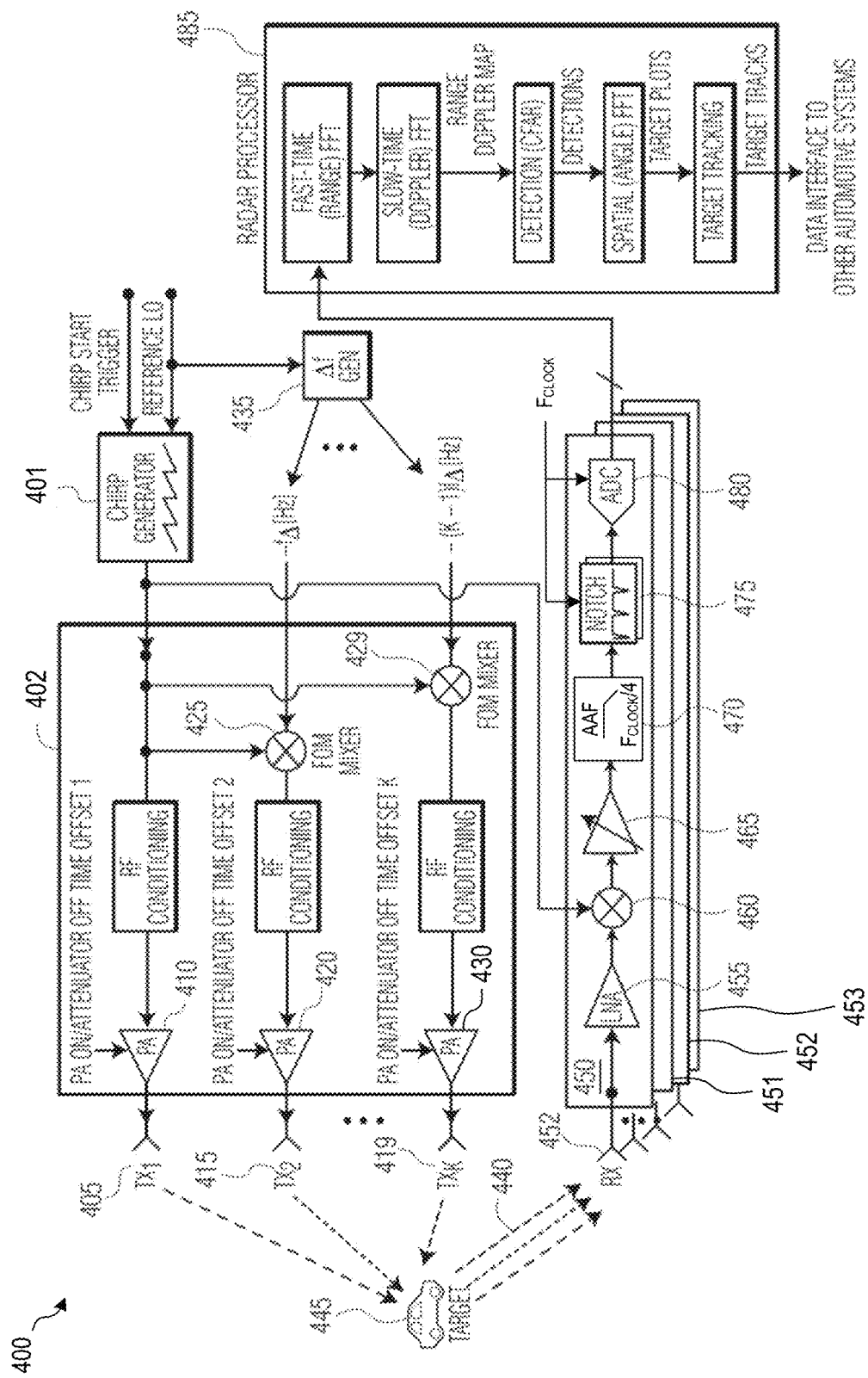
FIG. 4 is a simplified functional block diagram of a FanTOM chirp radar system in accordance with selected embodiments of the present disclosure.

To provide additional details for an improved understanding of selected embodiments of the present disclosure, reference is now made to FIG. 4 which depicts a simplified functional block diagram of a FanTOM chirp radar system 400 in accordance with selected embodiments of the present disclosure. In the depicted system 400, a reference chirp generator 401 generates the reference chirp for each of the transmit channels (e.g., 405, 415, and 419) in the transmitter module 402. In each transmit channel, an appropriate frequency offset is applied utilizing a frequency offset mixer (FOM) (e.g., 425 and 429) associated with the transmit channel, and an appropriate power amplifier (PA) (e.g., 410, 420, 430) ON time offset is engaged to transmit correctly delayed chirps from the individual transmit channels.

At the receiver modules 450-453, the reflected signals are received as RF signal and then amplified (e.g., using low noise amplifier 455) and mixed with the reference chirp (e.g., at mixer 460) to extract the IF signals. The IF signals are then fed to a variable gain amplifier (465) which amplifies the signal before being filtered by the tunable anti-aliasing low-pass filter (470) and then fed to a bank of configurable notch filters (475) to remove zero-range components which are likely due to Tx-to-Rx spillover before being sampled by the associated ADC 480.

In selected embodiments, the notch filter 475 provides an n-path filter (e.g., a sampled data filter) that is an analog-domain tunable and configurable notch filter bank circuit for filtering out the zero-range interference in the fast-time spectrum of each transmitter. The zero-range interference occurs when the emission from the transmitter 402 is not sufficiently isolated from the receiver module 450 so that it is observable in the received signal. This is known as the transmitter-to-receiver spill-over interference. Because such spill-over interference is not a target return, its presence interferes with the detection of valid targets that are close in distance due the spectral skirts caused by filter mismatch and the phase noise of the system. Likewise, reflective structures of the car around the radar (such as a bumper) result in close-in echoes (with nearly zero range) which interfere with the detection of valid targets. The spillover and close-in interference not only cause interference, but also may saturate the ADC, so they need to be suppressed. Conventionally, such interference could be suppressed with analog filters, such as by employing an analog high-pass filter (HPF) with tunable pass-band frequency after the chirp mixer 460 to suppress the zero-range interference signals. However, such a single-notch filter cannot filter out multiple zero-range signals in the received FanTOM signals that occur in multiple non-zero frequencies. To suppress these interference signals, the notch filter 475 may be embodied as a plurality of (n) filter 'paths' to implement an n-path filter (e.g. a sampled data filter) or bank of notch filters 475 wherein each of the filter notches is tuned to a corresponding zero-range frequency using a bank of (n) filter paths comprised of switches, capacitors, and resistors which form a notch at the switching frequency of the paths as well as a series of notches at its harmonic frequencies. By specifying the number and size of the capacitors and resistors used and by controlling the switching interval via the applied sampling clock frequency $F_{CLOCK}$, the position and width of the notches in the notch filter(s) 475 can be shifted in the frequency domain. In addition, by controlling the path attenuation via the individual path resistor, capacitor and switch element values and configuration, the width and depth of the filter notches can also be adjusted. The use of the harmonic notches of an n-path notch filter 475 to suppress spill-over interference is ingenious and inventive because such harmonics are usually considered as a defect or an undesirable side-effect of n-path filters.

Figure 5:
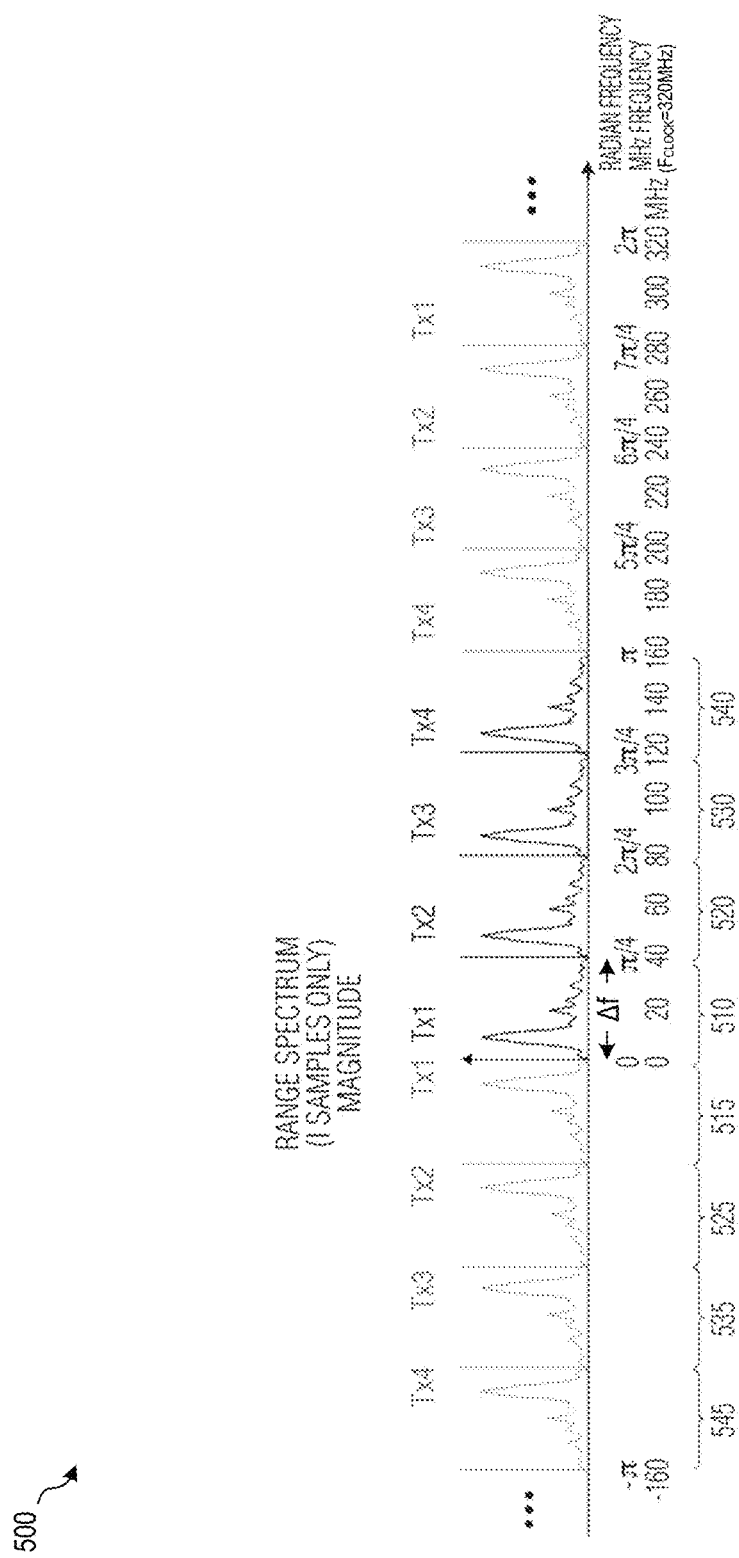
FIG. 5 is a diagram illustrating an example of the range spectrum of a receive channel of a four transmit channel FanTOM chirp system in accordance with selected embodiments of the present disclosure.
Figure 10:
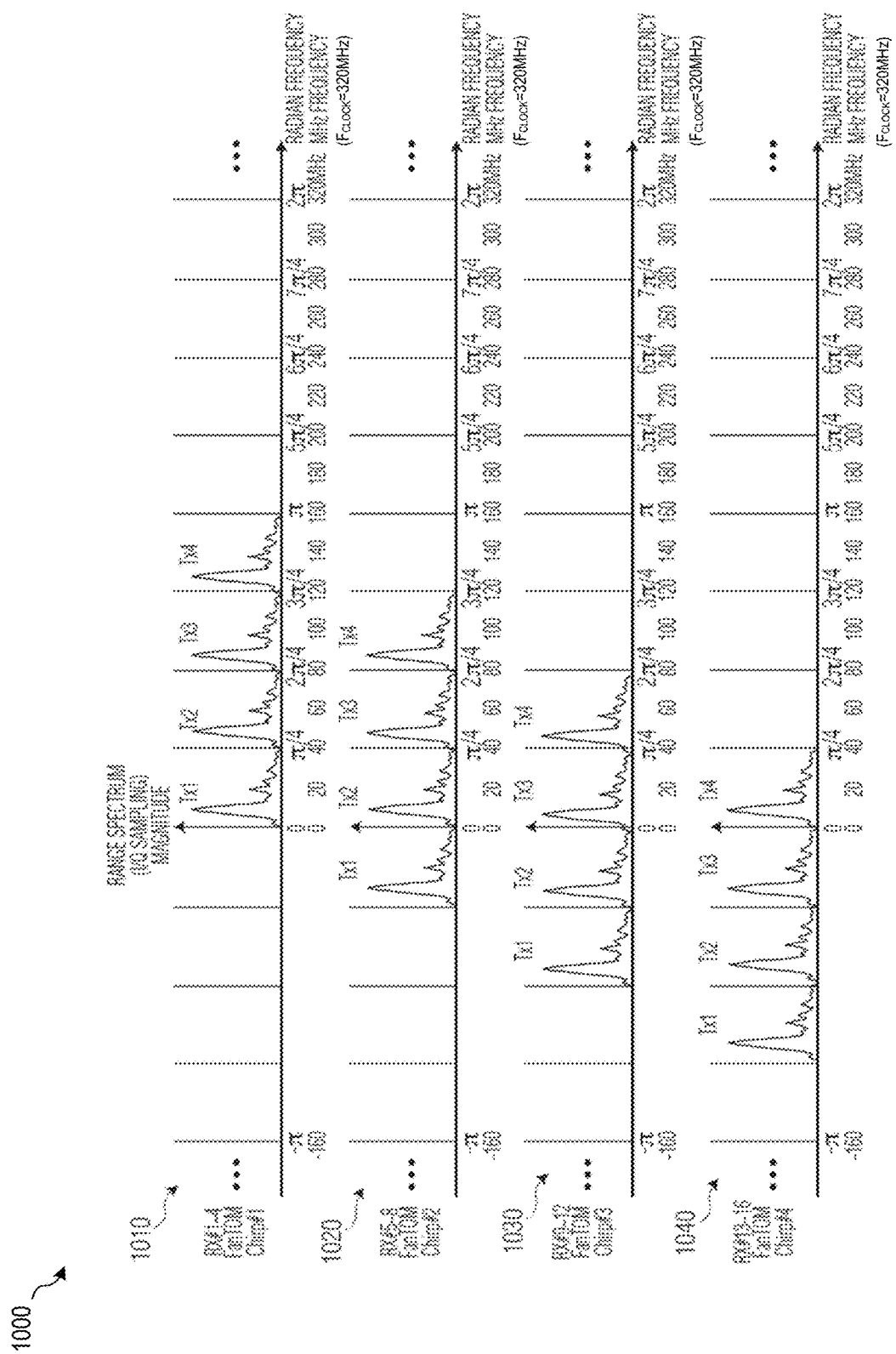
FIG. 10 is a range spectrum mapping illustrating reference chirp mixing with FQ sampling in accordance with selected embodiments of the present disclosure.
Figure 12A:
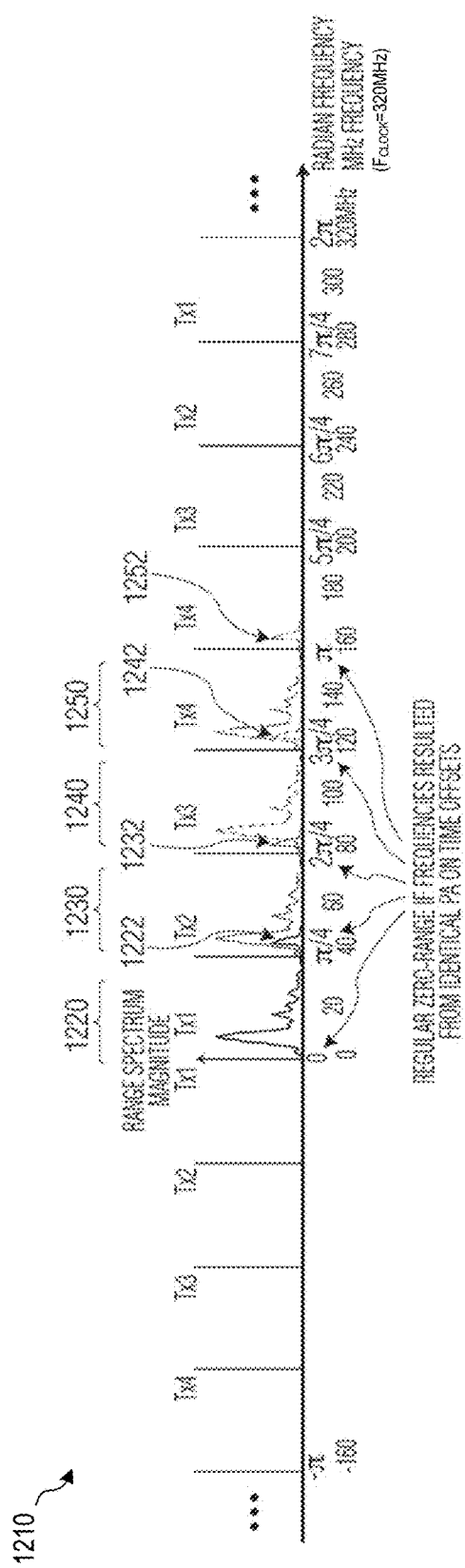
FIGS. 12A and 12B are range spectrum mappings illustrating results from varying power amplifier offset between transmitters in accordance with selected embodiments of the present disclosure.

To provide a first example embodiment where the transmitter module 402 includes four transmitters $TX_1$-$TX_4$ with a 40 MHz frequency offset between each, a receiver module 450 which is configured to process single-ended filter input signals will require an n-path notch filter 475 with notches at four corresponding frequencies (e.g., at DC or 0 MHz, 40 MHz, 80 MHz and 120 MHz), with all notches having a predetermined minimum attenuation (e.g., at least 15 dB). In this example, the single-ended N-path notch filter 475 is clocked with a sampling clock frequency $F_{CLOCK}=F_{OFFSET}*N_{PATH}$, where $F_{OFFSET}$ is the first notch frequency or offset frequency (e.g., 40 MHz in this example) and where $N_{PATH}$ is the number of paths in the filter. Since the number of paths required to achieve sufficient attenuation for the worst case or highest frequency notch (e.g., 120 MHz in this example), the number of paths must be at least four times the number of transmitters, which is $N_{PATH}=16$ paths for 4 transmitters, resulting in an N-path filter clock frequency of $F_{CLOCK}=40$ MHz*16=640 MHz. In this case, the sample rate $F_{CLOCK}$ for a Nyquist-rate ADC 480 can also be set to 640 MHz so that only one clock is needed for both the notch filter 475 and ADC 480. Of course, it will be appreciated that a sigma-delta ADC 480 may be used instead of a Nyquist-rate ADC, in which case the clock rate of the modulator portion of the ADC 480 will be much higher than 640 MHz. The clock rate for the n-path filter and the cut off frequency for the anti-alias filter will stay the same but the sigma-delta ADC clock rate will be higher. Note that a (digital) decimation filter that lowers the output rate of the ADC to the final desired rate—which is the number of transmitters N times the offset frequency Δf times 2 (e.g., 320 MHz as shown in FIGS. 5, 10 and 12A)—can be included as part of the ADC 480 or as part of the radar processor 485 that follows the ADC 480 if desired.

By setting the clock rate $F_{CLOCK}$ for at least the n-path notch filter 475 (and optionally also the ADC 480) at four times the highest frequency that must be passed by the n-path notch filter 475 (160 MHz in this example), the corner frequency of the anti-alias filter (AAF) 470 can be set at 160 MHz (i.e., $F_{CLOCK}/4$) so that there is enough frequency range (160 MHz to 480 MHz in this example) for the AAF 470 to sufficiently attenuate any potentially interfering signals before they are sampled. Note that the same AAF 470 will prevent aliasing for both the N-path notch filter 475 and the ADC 480. As seen from the foregoing, a single-ended n-path notch filter 475 may be implemented with its number of paths $N_{PATH}$ set to four times the number of transmitters. In addition, the sampling clock frequency (i.e., the sample rate), $F_{CLOCK}$, for the resulting n-path notch filter 475 and optionally also the ADC 480 will be the offset frequency of the lowest notch times the number of paths (40 MHz*16=640 MHz for this example). Finally, the corner frequency of the AAF 470 will be set to the clock rate $F_{CLOCK}$ of at least the n-path notch filter (and optionally also the ADC) divided by 4 (160 MHz for this example).

To provide a second example embodiment where the transmitter module 402 includes four transmitters $TX_1$-$TX_4$ with a 40 MHz frequency offset between each, a receiver module 450 which is configured to process fully-differential filter input signals will require an n-path notch filter 475 with notches at four corresponding frequencies (e.g., DC, 40 MHz, 80 MHz and 120 MHz), with all notches having a predetermined minimum attenuation (e.g., at least 15 dB). However, since a fully-differential N-path notch filter 475 will cancel the notches at even-order harmonics of the first notch frequency, a plurality of differential N-path notch filters may be required to achieve the desired notch filter performance. For example, a 4-path notch filter 475 with a first notch at 40 MHz will also produce a notch a 120 MHz, but the notches at 80 MHz and 160 MHz are cancelled. To address the problem with cancelled notches at even order harmonics of a differential notch filter, the fully-differential n-path notch filter 475 may be implemented with a plurality of notch filter sections which are each clocked with the sampling clock frequency $F_{CLOCK}=F_{OFFSET}*N_{PATH}$ to produce notches at the correct locations (i.e., 40 MHz, 80 MHz and 120 MHz for this example). For example, a first n-path filter section will include 16 paths and will be clocked at $F_{CLOCK}$=640 MHz so that notches with adequate attenuation are produced at 40 MHz and 120 MHz. In addition, a second n-path filter section will include 8 paths and will also be clocked at 640 MHz so that a notch with adequate attenuation will be produced at 80 MHz. In this case, the clock rate $F_{CLOCK}$ for the ADC 480 can also be set to 640 MHz so that only one sampling clock $F_{CLOCK}$ is needed for both the n-path notch filters 475 and for the ADC 480.

By setting the clock rate for the first and second N-path filter sections 475 and the ADC 480 at four times the highest frequency that must be passed by the n-path filter (160 MHz in this example), the corner frequency of the anti-alias filter (AAF) 470 can be set at 160 MHz (i.e., Fs/4) so that there is enough frequency range (160 MHz to 480 MHz in this example) for the AAF 470 to sufficiently attenuate any potentially interfering signals before they are sampled. Note that the same AAF 470 will prevent aliasing for both the N-path filter 475 and the ADC 480. As seen from the foregoing, a fully-differential n-path notch filter 475 may be implemented with a plurality of separate sections in order to implement notches at the required frequencies. For example, a first notch filter section will have number of paths $N_{PATH}$ set to four times the number of transmitters to implement notches at the first and third harmonics of the lowest notch frequency (40 MHz and 120 MHz in this example) and the second notch filter section will have the number of paths $N_{PATH}$ set to two times the number of transmitters to implement the notch at the second harmonic of the lowest notch frequency (80 MHz in this example). If needed for a larger number of transmitters, the next notch filter section would have the number of paths $N_{PATH}$ set to the number of transmitters to implement the notch at the 4th harmonic of the lowest notch frequency. In the first notch filter section, the sampling clock frequency $F_{CLOCK}$ (i.e., the sample rate) will be the frequency of the lowest notch times the number of paths (e.g., 40 MHz*16=640 MHz for the first filter section in this example). In the second notch filter section, the sampling clock frequency $F_{CLOCK}$ will be the frequency of the lowest notch for this section (80 MHz in this example) times the number of paths (e.g., $N_{PATH}$=8), or $F_{CLOCK}$=80 MHz*8=640 MHz. If an additional path notch filter section was needed, the same pattern would be used so that the sampling clock $F_{CLOCK}$ for this section will be the frequency of the lowest notch for this section (160 MHz if needed) times the number of paths (e.g., $N_{PATH}$=4), or $F_{CLOCK}$=160 MHz*4=640 MHz. Again, the sampling clock frequency (i.e., sample rate), $F_{CLOCK}$, of the ADC 480 that follows the n-path notch filter will be set to at least the same value (640 MHz for this example) (or much higher in embodiments when a sigma-delta ADC) and then optionally decimated with a digital decimation filter. In addition, the corner frequency of the AAF 470 will be set to the clock rate of the n-path notch filter 475 and the ADC 480 divided by 4 (160 MHz for this example).

At the ADC 480, the notch-filtered signal is digitized, optionally decimated, and passed to the signal processing chain in radar processor 485. An example signal processing chain can include a fast-time range FFT spectrum analysis and a slow-time Doppler FFT spectrum analysis, followed by detection (CFAR) and spatial (angle) FFT estimation, and then target tracking. The output of the radar processor 485 can be fed to other vehicular control and processing systems via a data interface and networking systems (not shown).

Embodiments of the present system provide signal chirps that each start at the same frequency and end at the same frequency, thus, a central frequency is identical across all transmit channels resulting also in an identical wavelength across all the transmit channels. In light of this identical wavelength, any given radar target at an arbitrary range from the transmitting antennas will result in the same phase offset across each transmit channel. In light of this identical phase offset across the entire virtual antenna array, there is no angle estimation error.

To provide additional details for an improved understanding of selected embodiments of the present disclosure, reference is now made to FIG. 5 which is a diagrammatic illustration of an example of the range spectrum (I-samples only) 500 of a receive channel of a four-transmit channel FanTOM chirp system, where the individual range spectrums from different transmitters are separable in the range domain, or alternatively in the IF spectrum domain. Due to the arrangement of the four transmit chirps (e.g., 305, 310, 315, 320 in FIG. 2) from the transmitters (e.g., $TX_1$-$TX_K$ in FIG. 4), target echoes from individual transmitters will be distinctly situated on different non-overlapping sections of the computed range spectrum 500, with each occupying a different Δf section on either side of zero frequency. Continuing with the example of a FanTOM chirp system with four transmit channels, the target echo from the first transmitter $TX_1$ appears in the IF frequency sections between 0 and Δf (510) and 0 and −Δf (515). In addition, the target echo from the second transmitter $TX_2$ appears in the IF frequency sections between Δf and 2Δf (520) and −Δf and −2Δf (525). Similarly, the target echo from the third transmitter $TX_3$ appears in the IF frequency sections between 2Δf and 3Δf (530) and −2Δf and −3Δf (535). And finally, the target echo from the fourth transmitter $TX_4$ appears in the IF frequency sections between 3Δf and 4Δf (540) and −3Δf and −4Δf (545). For a real ADC sample spectrum, the negative portion of the spectrum can be neglected.

As shown in FIG. 5, so long as the power amplifier ON offset time Δt and the frequency offset between transmit channels Δf are sufficiently large, the target echoes from different illuminators or transmit channels will not overlap, and therefore can be unambiguously separated. In the depicted range spectrum 500, the value of Δf=40 MHz provides sufficient frequency offset to separate the target returns from different transmitters $TX_1$. If the range spectrums were to overlap, then additional disambiguation processing would be needed. By repeating the range spectrum separation for each of the N receive channels and upon completion, one may obtain a total of N*K virtual receive antenna channels, where K=4 in the prior example. In this way, the MIMO virtual array can be constructed from the FanTOM chirp by dividing up the transmitters in the range domain, thereby forming a Range-Division (RD) MIMO.

Figure 6:
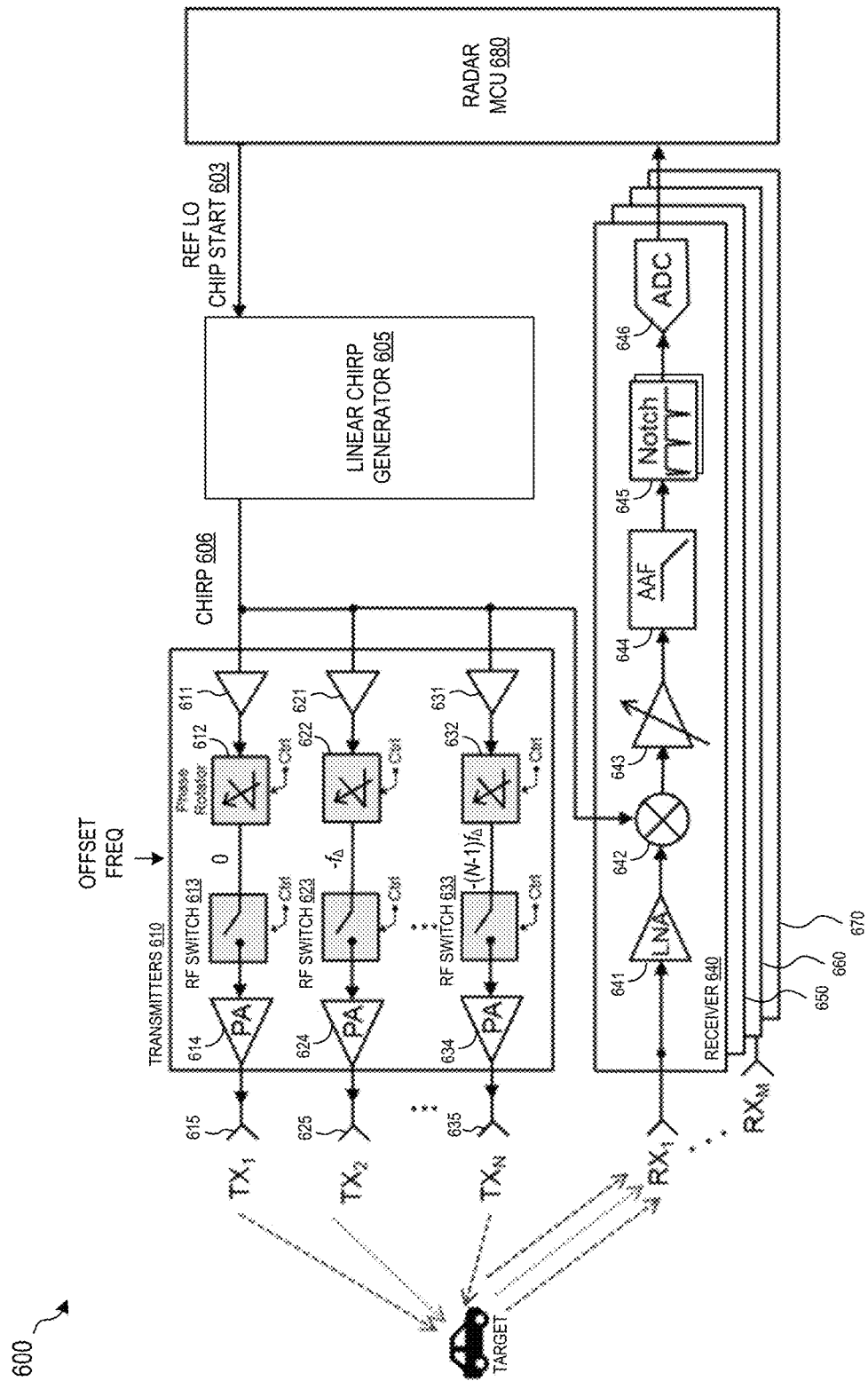
FIG. 6 is a simplified functional block diagram of a transceiver subsystem which uses phase rotators to implement a FanTOM chirp radar system in accordance with selected embodiments of the present disclosure.

For an improved understanding of selected embodiments of the present disclosure, reference is now made to FIG. 6 which is a simplified functional block diagram of a transceiver subsystem 600 which uses phase rotators 612, 622, 632 to implement a frequency and time offset modulation chirp radar system. The depicted transceiver subsystem 600 provides the frequency and time offsets of a FanTOM chirp by using a single reference chirp generator 605 which is triggered by a chirp control and start trigger 603 from the radar MCU 680 to generate a reference chirp signal 606. To this end, a linear chirp generator 605 may be connected to receive input program and control signals 603, including a reference local oscillator (LO) signal, a chirp start trigger signal, and program control signals. In response, a reference chirp signal 606 is generated and transmitted to the transmitters 610 where phase and time coding is applied using switched phase rotators that are controlled by the program control signals generated by the radar MCU 680. In the transmitters 610, the reference chirp signal 606 is provided to multiple transmit paths, each including a high-speed phase rotator or shifter (612, 622, 632) along with a corresponding RF switch (613, 623, 633) and transmit antenna (615, 625, 635) which are connected and configured to provide frequency and time offsets to the reference chirp signal 606.

In selected embodiments, each transmitter path which receives the reference chirp signal includes an input amplifier (e.g., 611, 621, 632) that is coupled to receive and amplify the reference chirp signal 606 for output to a corresponding high-speed phase rotator (e.g. 612, 622, 632), which is in turn coupled over an RF switch (613, 623, 633) to a corresponding power amplifier (e.g., 614, 624, 634) before transmission on a corresponding transmit antenna (615, 625, 635). In one example, a first high-speed phase rotator 612 would provide a frequency offset of zero for a first transmit path 611-615. In addition, a second high-speed phase rotator 622 would provide a frequency offset of $-f_A$ for a second transmit path 621-625, and an N-th high-speed phase rotator 632 would provide a frequency offset of $-(N-1)f_A$ for an N-th transmit path 631-635. In each of the transmit paths, time offset of chirp transmission is provided using a corresponding RF switch 613, 623, 633 that controls the provision of the frequency offset chirp to a transmit path power amplifier (e.g., 614, 624, 634) which may optionally be included for conditioning the signal levels prior to transmission by the associated transmit antenna (e.g., 615, 625, 635). Alternatively, if it is desirable to keep the power amplifiers powered up (depending upon the nature of the application), the RF switches 613, 623, 633 can be placed between the output of power amplifiers 614, 624, 634 and their associated antenna circuitry (e.g., 615, 625, 635). The receiver path (e.g., 640) of transceiver subsystem 600 is the same as receiver module 450 depicted in FIG. 4 with the reference chirp signal 606 from the reference chirp generator 605 being provided to mixer 642 where it is combined with the amplified target return signal generated by the low noise amplifier 641 before subsequent receive processing by the variable gain amplifier 643, tunable anti-aliasing low-pass filter 644, bank of configurable notch filters 645, and ADC 646. As will be appreciated, the reference chirp signal 606 can be provided in baseband or intermediate frequency. Further, frequency multiplication can be performed in one or multiple stages depending upon the nature the application.

Figure 7:
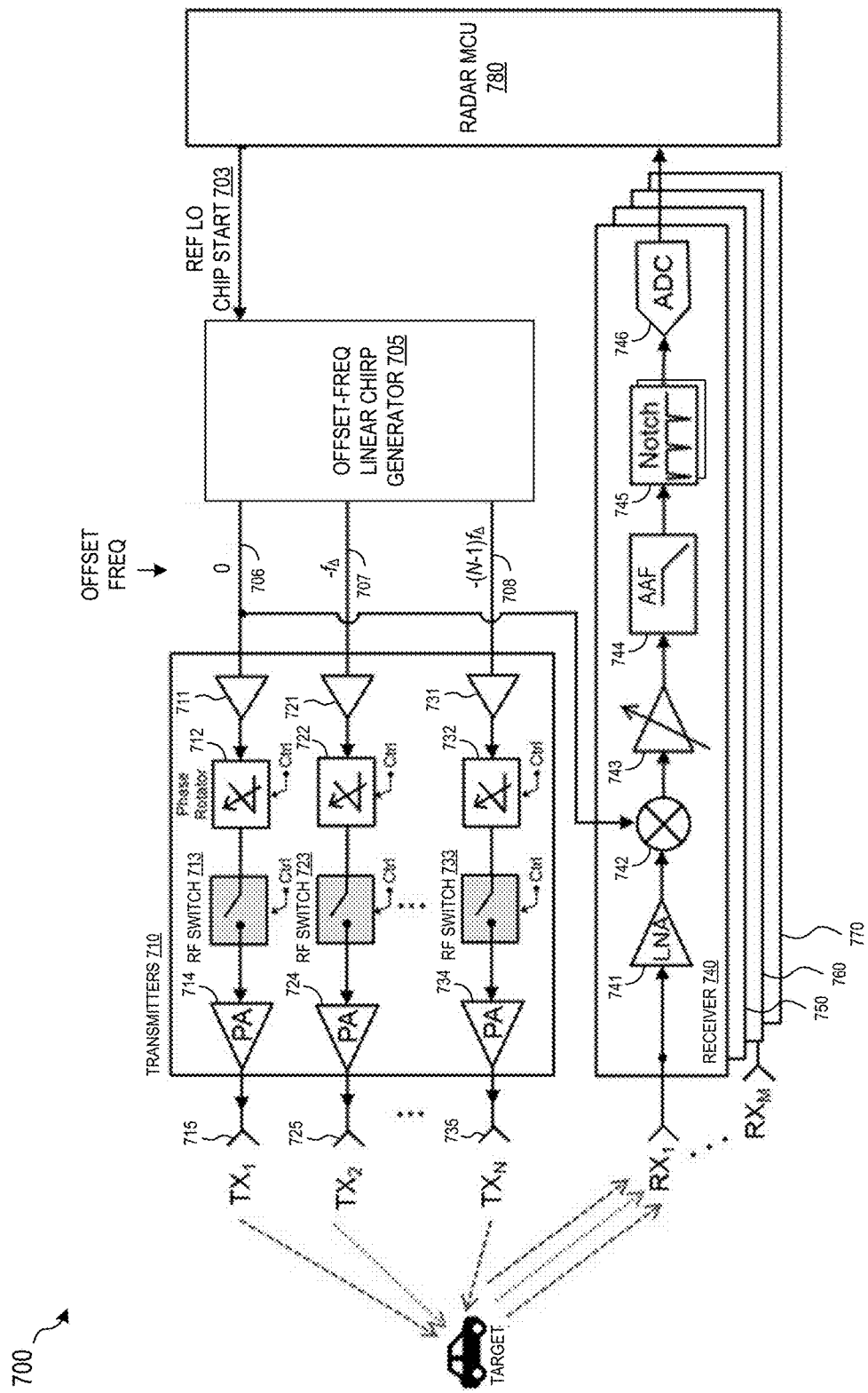
FIG. 7 is a simplified functional block diagram of a transceiver subsystem in which frequency offset chirps are generated by a chirp generator to implement a FanTOM chirp radar system in accordance with selected embodiments of the present disclosure.

For an improved understanding of selected embodiments of the present disclosure, reference is now made to FIG. 7 which is a simplified functional block diagram of a transceiver subsystem 700 which uses an offset frequency linear chirp generator 705 to generate a plurality of frequency offset chirps 706-708 for a frequency and time offset modulation chirp radar system. The depicted transceiver subsystem 700 provides the frequency offset chirps 706-708 by using a single offset frequency linear chirp generator 705 which is triggered by input program and control signals 703 from the radar MCU 780 which may include a reference local oscillator (LO) signal, a chirp start trigger signal, and program control signals. In selected embodiments, the offset frequency linear chirp generator 705 may be implemented with a plurality of frequency offset generators or a single offset-frequency linear chirp generator. However constructed, the offset frequency linear chirp generator 705 generates frequency offset chirps 706-708 that are provided to respective transmit paths in the transmitters 710 where additional signal conditioning may be applied. In an example embodiment, the offset frequency linear chirp generator 705 may generate a first chirp signal 706 having a frequency offset of zero for a first transmit path 711-715, a second chirp signal 707 having a frequency offset of $-f_A$ for a second transmit path 721-725, and a third chirp signal 708 having a frequency offset of $-(N-1)f_A$ for a third transmit path 731-735. In turn, each transmitter path receives the corresponding chirp signal at an input amplifier (e.g., 711, 721, 732) that is coupled to amplify the received chirp signal for output to a corresponding high-speed phase rotator (e.g. 712, 722, 732) that are controlled by the program control signals generated by the radar MCU 780. In selected embodiments, the phase rotators (e.g. 712, 722, 732) may provide rotator functions that are independent of FanTOM and can be used simultaneously with FANTOM signal processing. For example, in selected automotive radar signal processing applications, the phase rotators (e.g. 712, 722, 732) may be used in the signal processing chain to encode individual transmitter with distinct phase shift to achieve many different tasks including but not limited to transmit phase calibration, transmitter beamforming, slow-time phase coded Doppler division MIMO waveform, slow-time phase coded code division MIMO waveform, etc. The phase rotator outputs are then coupled over RF switches (713, 723, 733) to a corresponding power amplifier (e.g., 714, 724, 734) before transmission on a corresponding transmit antenna (715, 725, 735). In each of the transmit paths, time offset of the corresponding frequency offset chirp transmission is provided using a corresponding RF switch (713, 723, 733) that controls the provision of the frequency offset chirp to a transmit path power amplifier (e.g., 714, 724, 734) which may optionally be included for conditioning the signal levels prior to transmission by the associated transmit antenna (e.g., 715, 725, 735). Alternatively, if it is desirable to keep the power amplifiers powered up (depending upon the nature of the application), the RF switches 713, 723, 733 can be placed between the output of power amplifiers 714, 724, 734 and their associated antenna circuitry (e.g., 715, 725, 735). The receiver path (e.g., 740) of transceiver subsystem 700 is the same as receiver module 450 depicted in FIG. 4 with the reference first chirp signal 706 (which has no frequency offset) from the reference chirp generator 705 being provided to mixer 742 where it is combined with the amplified target return signal generated by the low noise amplifier 741 before subsequent receive processing by the variable gain amplifier 743, tunable anti-aliasing low-pass filter 744, bank of configurable notch filters 745, and ADC 746. As will be appreciated, frequency multiplication can be performed in one or multiple stages depending upon the nature of the application.

Figure 8:
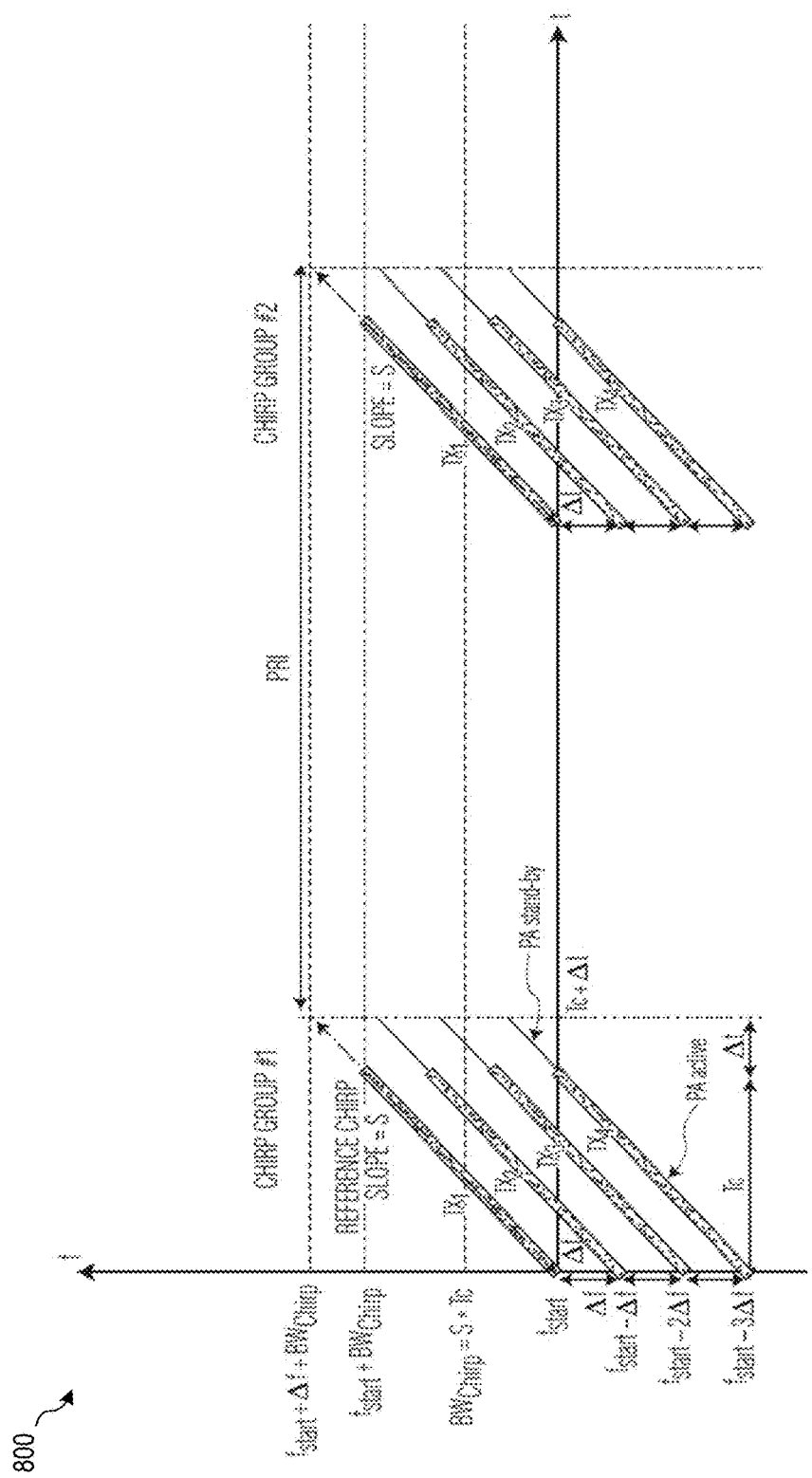
FIG. 8 is a simplified graph illustrating a frequency plan of an exemplary four-transmit channel frequency-offset modulation (FOM) range division (RD) MIMO chirp system in accordance with selected embodiments of the present disclosure.

For an improved understanding of selected embodiments of the present disclosure, reference is now made to FIG. 8 which is a diagram illustrating a frequency plan 800 of an exemplary four-transmit channel frequency-offset modulation (FOM) range division (RD) MIMO chirp system. Conventional FOM RD MIMO systems have each transmit channel transmit chirp at a different central frequency simultaneously, resulting in differing wavelengths and consequently non-identical phase offsets due to the residual distance to the closest range cells center. These non-identical phase offsets, if not corrected, result in estimation bias and ambiguity in the angle processing output. Thus, additional processing is performed to mitigate the residual range angle ambiguity. Embodiments utilizing the FanTOM chirp eliminate the residual range versus angle ambiguity of traditional ROM RD MIMO systems.

Further, compared to traditional TD MIMO systems, in which chirp transmissions are well separated, the FanTOM chirp system permits overlapped transmissions. In certain examples, the time offset, $\Delta t$ (~2 μs), is significantly shorter than the chirp transmit duration, Tc (on the order of tens of microseconds), and thus significant overlap is present. The small time offset allows a large number of transmit channels to be transmitted in the FanTOM fashion. As an example, for a Tc=30 μs and $\Delta t$=2 μs with K=12 (transmit channels), the chirp group duration (K*$\Delta t$+Tc) becomes 54 μs. If there is a 6 μs duration before the next chirp group, a pulse repetition interval (PRI) of 60 μs is realized. If a frame has M=256 chirp groups, the frame duration is 15.36 ms (256*60). This short frame duration is typically safe from range migration for typical automotive applications and can be supportive for a fast frame update. On the other hand, for TD MIMO to support 12 transmit channels, assuming the same 6 μs silent period, a minimum PRI of 432 μs (K*(Tc+6)=12*(30+6)) is obtained with a frame duration of 110.592 ms (256*432), which is prohibitively long and can result in a potentially severe range walk as well as a low frame rate.

The FanTOM chirp MIMO also compares favorably to other traditional radar systems. For example, with phase modulated continuous wave (PMCW) coded waveform radar systems, where the orthogonality between the phase codes degrades with a Doppler shift (e.g., the binary phases are no longer 180° apart due to the Doppler shift). In such systems, the MIMO virtual array construction is prone to leakage in that separation of the various transmitters signals cannot be performed due to loss of orthogonality. The present FanTOM-based MIMO does not suffer from Doppler degradation and orthogonality is maintained. Similarly, with orthogonal frequency division multiplexing (OFDM) radar systems, the orthogonality between the subcarriers degrades with Doppler shift (e.g., the separation between subcarriers changes with differing Doppler making them non-orthogonal). In such systems, the MIMO virtual array construction is also prone to leakage in that separation of the transmitters signals cannot be performed due to loss of orthogonality. Again, the proposed FanTOM-based MIMO does not suffer from Doppler degradation and orthogonality is maintained regardless of the Doppler. In radar systems utilizing Doppler Division (DD) MIMO waveforms, targets are separated in the Doppler spectrum domain. But the FanTOM-based MIMO does not reduce the maximum unambiguous Doppler by multiple folds as performed by DD MIMO, and so the Doppler performance is not degraded.

As will be appreciated, the transmit and receive channels may be situated on the same transceiver chip or situated on different transmitter and receiver or transceiver chips. Unless otherwise specified, there is no required limitation on how the transceiver channels should be arranged related to physical chips.

Figure 9:
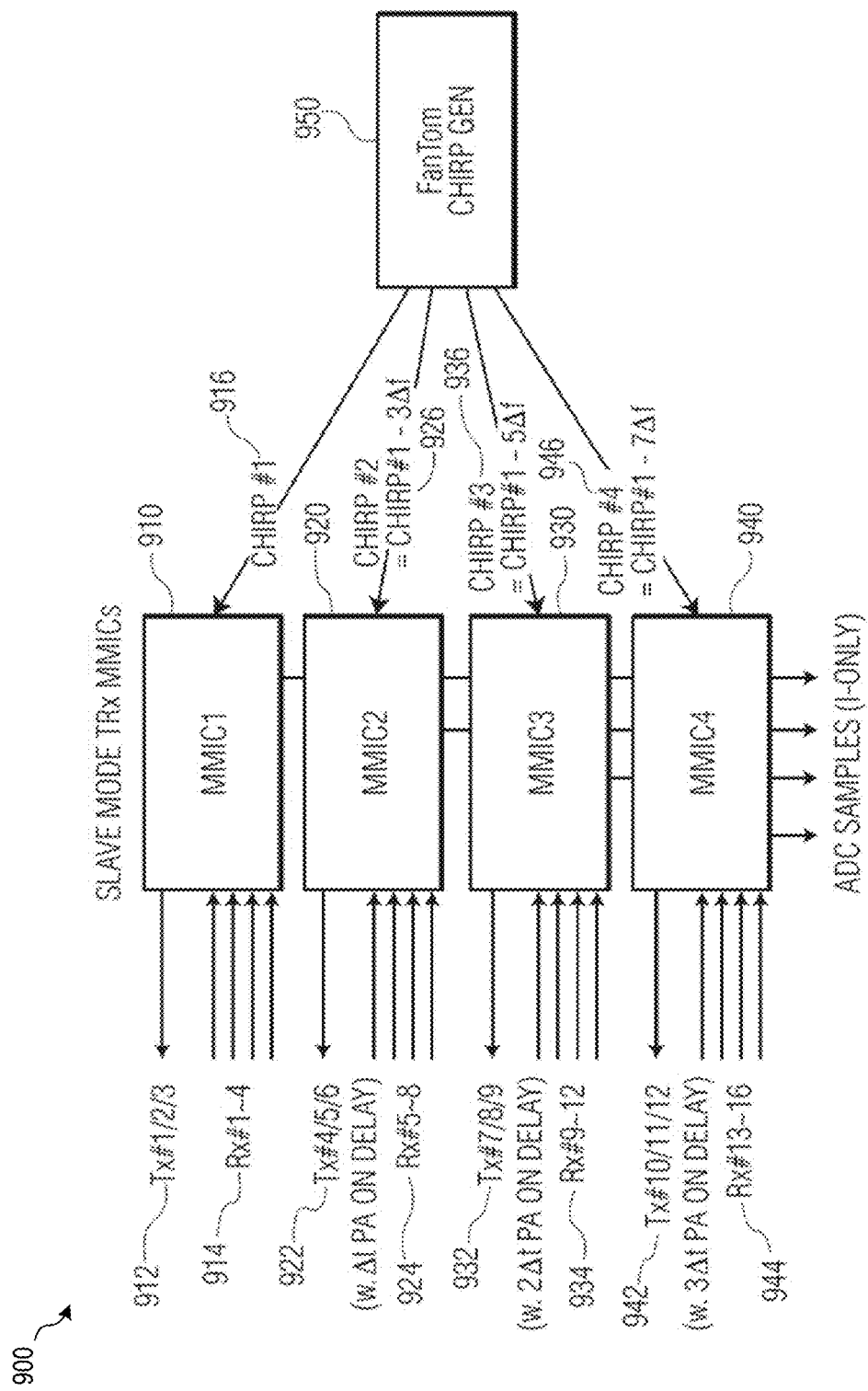
FIG. 9 is a simplified block diagram illustrating an example transceiver system in which a set of receive channels can use different reference chirps and any receive channel can use a reference chirp associated with a different transmitter than that of TX1.

Turning now to FIG. 9, there is depicted a simplified block diagram illustrating an example transceiver system 900 in which a set of receive channels can use different reference chirps, and any receive channel can use a reference chirp associated with a different transmitter than that of a first transmitter TX #1. Transceiver system 900 provides 12 transmit channels formed in groups of three and 16 receive channels formed in groups of four. One transmitter from each TX group is selected for FanTOM chirp transmission such that a range division MIMO factor of four can be achieved by transmitting four distinct chirps. While a TX channel of each group is transmitting, the two other TX channels of that group are switched off to prevent radiating. On receive, each group of four RX channels down mix the received RF signal with a distinct reference chirp corresponding to one of the FanTOM chirps transmitted by the four TX channels.

FIG. 9 illustrates such an arrangement using four transceiver ICs 910-940. Each of the transceiver ICs provides three TX channels (912, 922, 932, and 942, respectively) and four RX channels (914, 924, 934, and 944, respectively). These can execute in a slave mode by receiving FanTOM chirps from an external chirp generator 950. External chirp generator 950 can be configured to generate four distinct FanTOM chirps (e.g., 916, 926, 936, and 946) and transmit those chirps to the transceiver ICs 910, 920, 930, and 940. Each transceiver IC can transmit chirps corresponding to the fed FanTOM chirps and mix the received RF signal with that same chirp. In this manner, the individual transmitter signal can be extracted based on the following method.

As an example of the function of such a system, receivers 914 use FanTOM chirp #1 916 transmitted by Tx1, in group 912, as a reference chirp, receivers 924 use FanTOM chirp #2 926 transmitted by Tx4, in group 922, as a reference chirp, receivers 934 use FanTOM chirp #3 936 transmitted by Tx7, in group 932, as a reference chirp, and receivers 944 use FanTOM chirp #4 transmitted by Tx10, in group 942, as a reference chirp. The sections of the range spectrum of each receiver group corresponding to the transmit channel can be found according to the following mapping, assuming I/Q ADC sampling is available.

RX #1~4 with FanTOM Chirp #1 @ Tx1 as reference chirp:
  [0~$\Delta f$)→Tx1
  [$\Delta f$~2$\Delta f$)→Tx4
  [2$\Delta f$~3$\Delta f$)→Tx7
  [3$\Delta f$~4$\Delta f$)→Tx10

RX #5~8 with FanTOM Chirp #2 @ Tx4 as reference chirp:
  [-$\Delta f$~0)→Tx1
  [0~$\Delta f$)→Tx4
  [$\Delta f$~2$\Delta f$)→Tx7
  [2$\Delta f$~3$\Delta f$)→Tx10

RX #9~12 with FanTOM Chirp #3 @ Tx7 as reference chirp:
  [-2$\Delta f$~-$\Delta f$)→Tx1
  [-$\Delta f$~0)→Tx4
  [0~$\Delta f$)→Tx7
  [$\Delta f$~2$\Delta f$)→Tx10

RX #13~16 with FanTOM Chirp #4 @ Tx10 as reference chirp:
  [-3$\Delta f$~-2$\Delta f$)→Tx1
  [-2$\Delta f$~-$\Delta f$)→Tx4
  [-$\Delta f$~0)→Tx7
  [0~$\Delta f$)→Tx10

Based on the above example, IF spectrum section mapping transmitter signals can then be separated and extracted for a MIMO virtual array construction.

Turning now to FIG. 10, there is depicted a range spectrum mapping 1000 illustrating reference chirp mixing with FQ sampling, as discussed above. Mapping 1010 illustrates the range spectrum mapping of receivers 1-4 from FanTOM chirp #1. Mapping 1020 illustrates the range spectrum mapping of receivers 5-8 from FanTOM chirp #2. Mapping 1030 illustrates the range spectrum mapping of receivers 9-12 from FanTOM chirp #3. Mapping 1040 illustrates the range spectrum mapping of receivers 13-16 from FanTOM chirp #4.

If only real-channel ADC samples are available, the mapping illustrated in FIG. 10 will not work because of the conjugate symmetric nature of the resulting spectrum. In such a case, the frequency offset between transmitters can be doubled to result in a staggered range division. In other words an empty space left between two transmitters such that the resulting conjugate symmetric spectrum does not result in an overlap.

Figure 11:
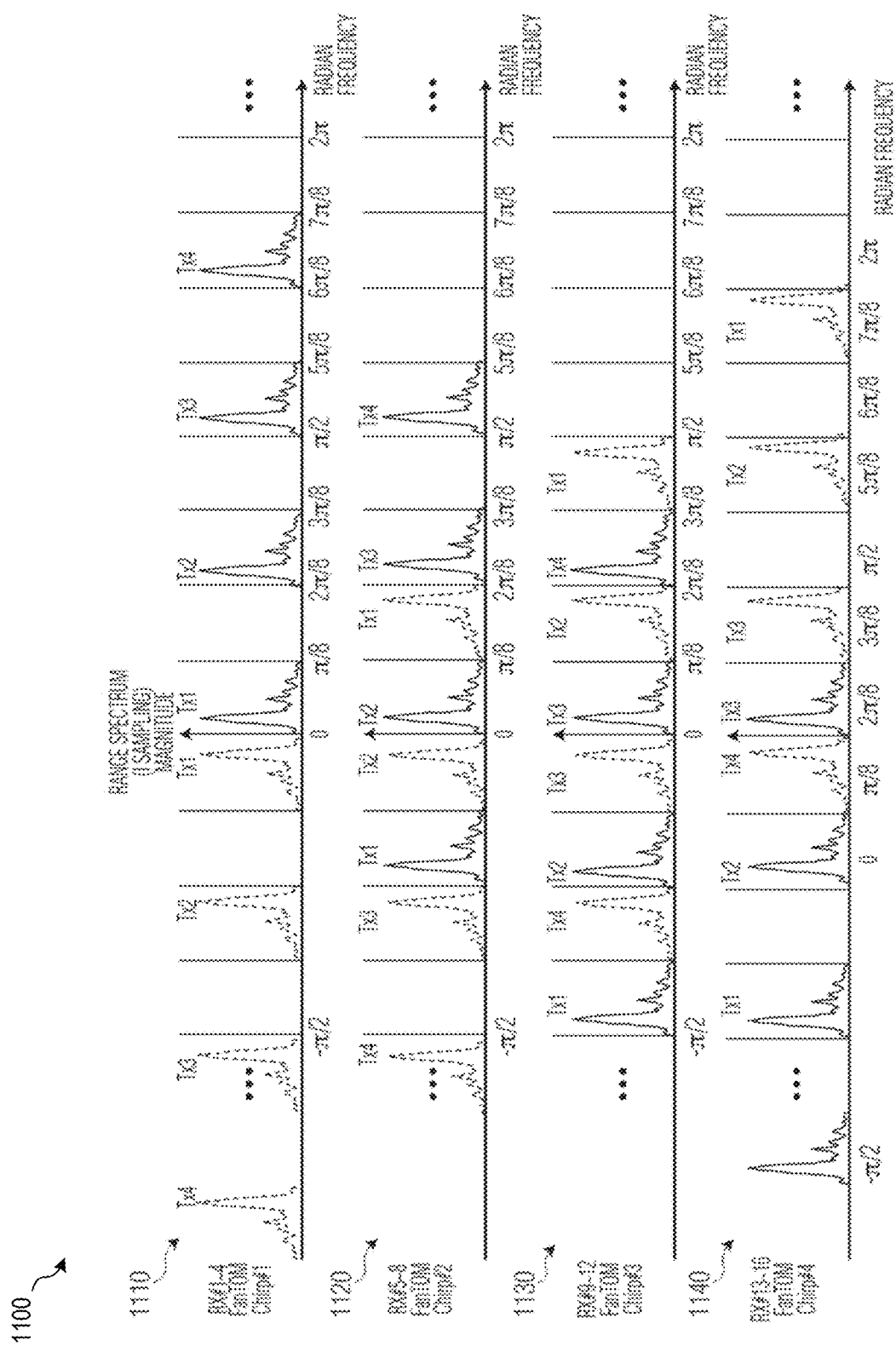
FIG. 11 is a range spectrum mapping illustrating reference chirp mixing with I-only sampling and a doubled frequency offset between transmitters in accordance with selected embodiments of the present disclosure.

Turning now to FIG. 11, there is depicted a range spectrum mapping 1100 illustrating reference chirp mixing with FQ sampling, with a doubled frequency offset between transmitters. Mapping 1110 illustrates the range spectrum mapping of receivers 1-4 from FanTOM chirp #1. Mapping 1120 illustrates the range spectrum mapping of receivers 5-8 from FanTOM chirp #2. Mapping 1130 illustrates the range spectrum mapping of receivers 9-12 from FanTOM chirp #3. Mapping 1140 illustrates the range spectrum mapping of receivers 13-16 from FanTOM chirp #4.

The arrangement illustrated in FIG. 9 can be useful for implementing FanTOM chirp RD MIMO using traditional LFM transceiver integrated circuits. For example, in the transceiver monolithic microwave integrated circuits (MMICs) (e.g., 910, 920, 930, and 940), each is equipped with three transmit channels and four receive channels and can be programmed to run in a slave mode by receiving FanTOM chirps from an external chirp generator 950 providing distinctive FanTOM chirps 916, 926, 936, 946 for each MMIC. Additional power amplifier switching control is provided to ensure appropriate PA ON offset time is applied. As discussed above, each MMIC transmits chirps corresponding to the received FanTOM chirps 916, 926, 936, 946 and mixes the received RF signal with the same chirp. Individual transmitter signals can still be extracted and corrected. The architecture illustrated in FIG. 9 provides benefits such as: 1) Tx-Rx spillover across different chips is minimized so zero-range spillover and non-zero IF frequency is less severe; and, 2) same-chip Tx-Rx spillover always results in zero IF, so a simple high-pass filter can be used to reduce the spillover.

Another advantage of the example architecture illustrated in FIG. 9 is that the three transmit channels can be configured to run in Time Division mode. In such a mode, an additional factor of three TD MIMO can be achieved such that a total of 12 MIMO Tx factor can be achieved from the four FanTOM RD with three TD MIMO processing. The 12 transmit MIMO coupled with the 16 receive channels provides a total of 192 virtual receive channels that can be constructed from the four traditional MMICs. This can significantly improve device resolution.

In an alternative embodiment, in applications in which controlling the direction of the radar signal is desirable, the three transmit channels on each MIMIC can be configured to run in a beamforming mode. In the beamforming mode, all three transmit channels transmit the same FanTOM chirp with an additional phase shift to direct the transmit pattern at a desired illumination direction.

Figure 12B:
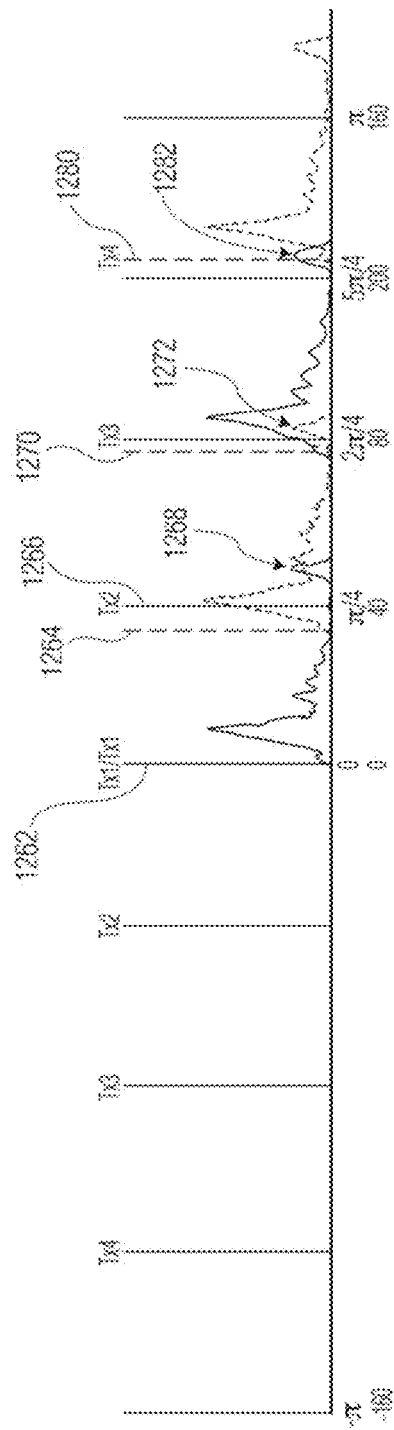

FIGS. 12A and 12B depict range spectrum mappings illustrating results from varying power amplifier offset between transmitters in accordance with selected embodiments of the present disclosure. In certain situations, it can be desirable to be able to resolve the presence of a radar target having and ambiguous range beyond the maximum instrument range of the radar system. As illustrated in range spectrum mapping 1210 of FIG. 12A, a beyond-the-maximum-range target will show up in the range spectrum of an adjacent transmitter and thus be detected is a return from the adjacent transmitter's illumination instead of the correct illuminator. As an example, target echo 1222 results from a beyond-the-maximum-range target illuminated by the transmitter associated with the portion of range spectrum 1220. Similarly, target echo 1232 results from the same target illuminated by the transmitter associated with the portion of range spectrum 1230. Likewise, target echo 1242 results from the target illuminated by the transmitter associated with the portion of range spectrum 1240, and target echo 1252 results from the target illuminated by the transmitter associated with the portion of range spectrum 1250. In light of the echo appearing in a neighboring transmitter's portion of the range spectrum, an ambiguity arises as to whether the target echo is associated with the transmitter for that portion of the range spectrum or the neighboring transmitter.

To overcome such an ambiguity, an embodiment is provided that varies the power amplifier ON offset between transmitters, so the amounts of offsets are not identical. Thus, when an ambiguous range occurs, the measured ambiguity between each transmitter portion of the spectrum range varies, thereby increasing the probability of detection of an echo from a beyond-the-maximum-range target. This is illustrated in range spectrum mapping 1260 of FIG. 12B. When varying the power amplifier ON offset time is engaged, the echo associated with beyond-the-maximum-range target shows up at differing ranges in the adjacent transmitter range spectrum. For example, the first transmitter signal originates at 1262, while the second transmitter signal originates at 1264, which is earlier than the identical power amplifier ON offset that would have been at 1266. Similarly, a third transmitter signal originates at 1270, which is also earlier than the identical power on offset would have been, but less so than that of 1264. An echo from a beyond-the-maximum-range target is illustrated at 1268. An echo from the same target, but from the second transmitter signal, is illustrated at 1272. The echo from the third transmitter is illustrated at 1282, subsequent to a transmission from a fourth transmitter at 1280. As illustrated, each echo from the beyond-the-maximum-range target shows up at differing ambiguous ranges in the adjacent transmitters range spectrum such that the target can be distinguished from normal targets. Normal targets will have a consistent range with respect to all transmitters. By checking the consistency of detected range across transmitters, and ambiguous target can be identified based on the inconsistency. In this manner, the beyond-the-maximum-range target can be ignored or otherwise processed.

Embodiments of the present invention provide a frequency and time offset modulation with increased ADC sample rate to allow a separation in the range spectrum of transmitter signals at reception. This combination enables construction of very large MIMO arrays, unlike the prior art.

Figure 13A:
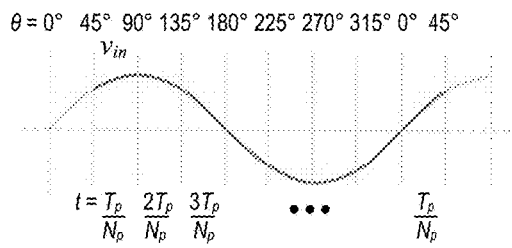
FIGS. 13A-C are a simplified depiction of the design and operation of a single-ended tunable n-path notch filter in accordance with selected embodiments of the present disclosure.
Figure 13A:
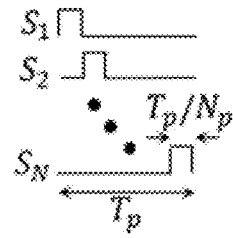
Figure 13A:
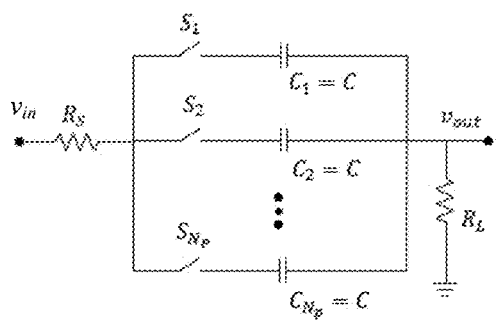
Figure 13A:
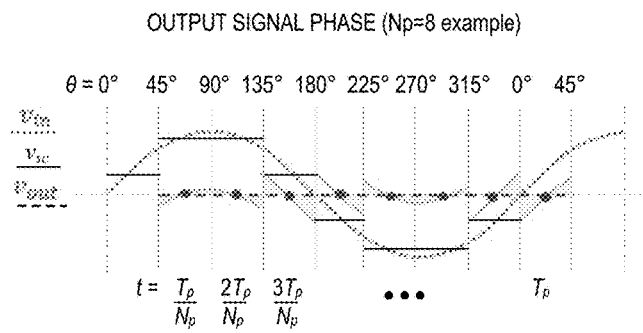
Figure 13B:
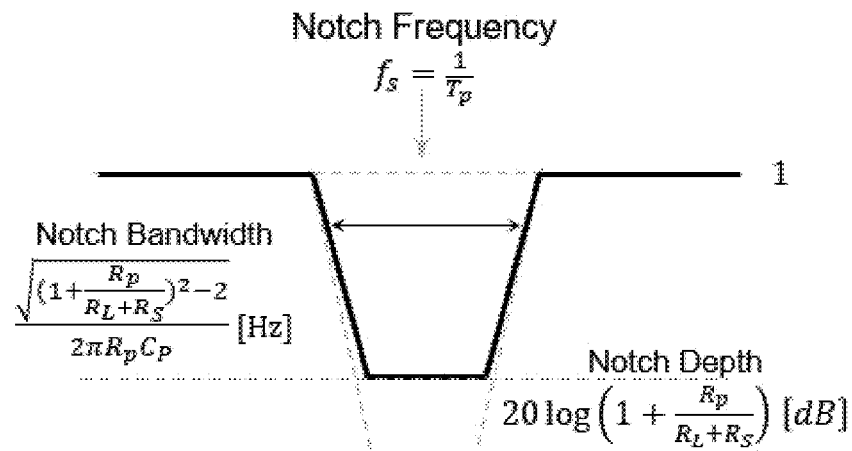
Figure 13B:
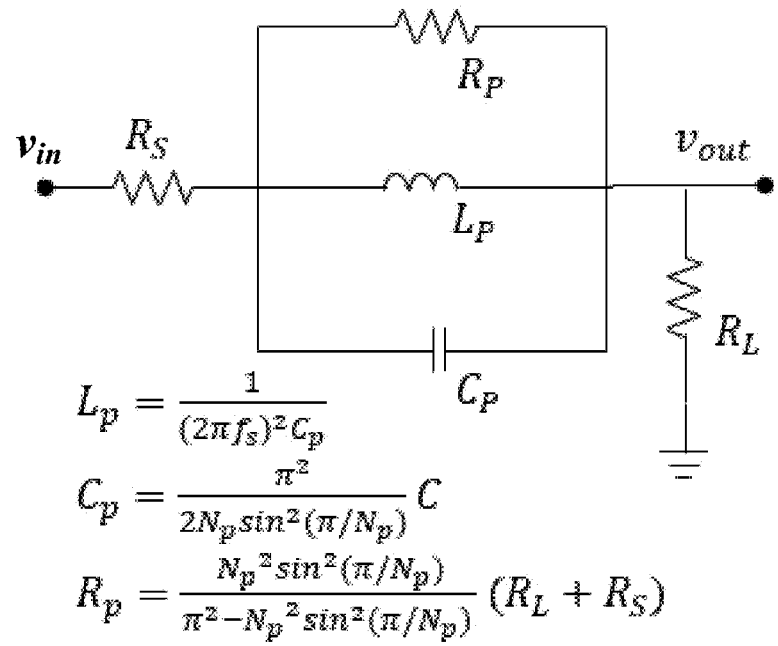
Figure 13C:
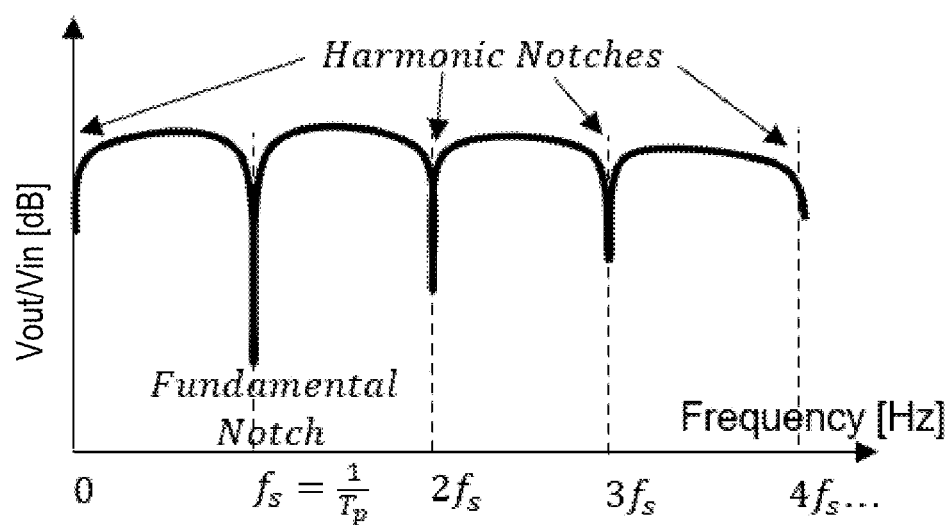

To provide additional details for an improved understanding of selected embodiments of the present disclosure, reference is now made to FIGS. 13A-C which illustrate simplified depictions 1300A-C of the design and operation of a single-ended tunable n-path notch filter with reference to various signal waveforms and circuit schematic representations 1301-1307 of an n-path notch filter used in a receiver module path to process radar target return signals generated from a plurality of frequency and time offset modulated radar chirp signals. In the depicted example shown in FIG. 13A, the n-path notch filter 1303 is a single ended notch filter having a plurality of Np=n paths connected to receive a single analog input Vin which is depicted with the filter input signal 1301. While any suitable filter circuit design may be used, the depicted n-path notch filter 1303 includes a shared input resistor Rs which represents the impedance of the input signal source Vin, for sequential application to the Np filter paths, each including an input switch Si (i=1-Np) connected in series with a sampling capacitor Ci (i=1-Np) between the analog input Vin and a filter output Vout that is connected over a load resistor $R_L$ to ground. For purposes of understanding the operational design of the n-path notch filter 1303 in implementing the first notch at the frequency Fs, where Fs=1/T p as shown in 1305 and $T_p$=duration of clocks for all n paths as shown in 1302, the equivalent RLC filter model 1306 is depicted as a shared input resistor Rs which represents the impedance of the input source Vin to the combined filter resistance Rp, filter inductance Lp, and filter capacitance Cp connected in parallel between the shared input resistor Rs and a filter output Vout that is connected over a load resistor $R_L$ to ground.

In operation and as shown in FIG. 13A, an input clock (not shown) having a sampling frequency $F_{CLOCK}$=Fs*Np may be used to generate input clocking signals 1302 that are applied to control the switches $S_1$-$S_{Np}$ in the notch filter 1303 so that they are sequentially closed over the time period Tp to connect the single analog input Vin to a corresponding filter path. As shown with the filter input signal waveform 1301 and switching clock waveform 1302, each input clocking signal 1302 has a controlled duration Tp/Np and relative position for the filter input signal 1301 so that the corresponding filter path is connected to receive the analog input Vin.

Consider the example of a single-ended N-path notch filter 1303 for Np=8, the output signal phase waveform 1304 shows a typical set of node voltages for a sinusoidal filter input signal Vin with a frequency which matches the switching clock frequency as illustrated in 1302. In the case where the RC time constant of the notch filter is much larger than the closing time of the switches Si, the voltages on the capacitors Ci contain approximately a constant value which is the integration of the part of the input signal Vin seen periodically by each capacitor Ci. The passive mixers which are realized by the switches $S_1$-$S_{Np}$ in the switched-capacitor n-path notch filter 1303 up-convert the DC voltages on the capacitors $C_1$-$C_{Np}$ and create a staircase approximation Vsc of the input signal Vin, as shown in the output signal waveform 1304 which depicts the staircase voltage Vsc along with the output voltage Vout=$(R_L/(R_L+R_S))(V_S-V_{SC})$ to illustrate that the notch filter 1303 provides a strong suppression of the input signal Vin at the switching frequency Fs=1/Tp. The fundamental notch response 1305 (shown in FIG. 13B) illustrates the suppression provided at the notch frequency Fs=1/Tp with a notch bandwidth and notch depth resulting from the switched-capacitor circuit and source and load resistors Rs, $R_L$ of the notch filter 1303 which provides a high impedance element for the switching frequency Fs while presenting a low impedance for the frequencies far away from the switching frequency. In addition to providing a notch characteristic at the path switching frequency Fs, the single ended n-path notch filter 1303 provides suppression of the input signal Vin at the harmonics of the switching frequency Fs, as shown in FIG. 13C with the harmonic notch response waveform 1307 where in the filter response includes notches at the fundamental notch frequency Fs and also at harmonics thereof (2 Fs, 3 Fs, 4 Fs).

As seen from the foregoing, the n-path notch filter 1303 includes input signal suppression at multiple harmonics of the switching frequency. Conventionally, such harmonic suppressions were considered a defect or undesirable side-effect of n-path filters. However, there is disclosed herein the beneficial use of such harmonic notches generated by an n-path notch filter to suppress spill-over interference effects from FanTOM chirp radar systems. There is also disclosed the beneficial use of controlling the input clock sampling frequency Fs by adjusting $F_{CLOCK}$ to tune the performance of the notch filter by adjusting the frequency locations of the filter notches. In embodiments where the number of paths N PATH in the notch filter meets or exceeds the number of transmit antennas in a FanTOM radar system, there is provided an efficient way to set up and coordinate the required frequency responses and sample rates between the required anti-aliasing filter (AAF), the n-path notch filter, and the analog-to-digital converter (ADC) for a single-ended receiver line up, where the n-path notch filter and ADC may be clocked with the same sampling clock Fs and where the corner frequency of the AAF may be to a predetermined fraction of the sampling frequency (e.g., Fs/4) so that the AAF can sufficiently attenuate any potentially interfering signals before they are sampled.

Figure 14A:
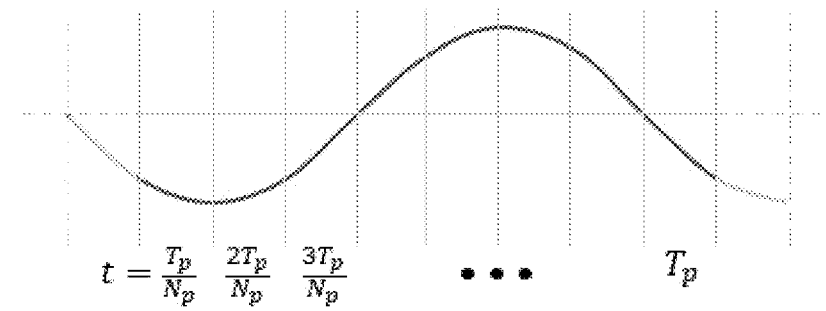
FIGS. 14A-D are a simplified depiction of the design and operation of a fully differential tunable n-path notch filter in accordance with selected embodiments of the present disclosure.
Figure 14A:
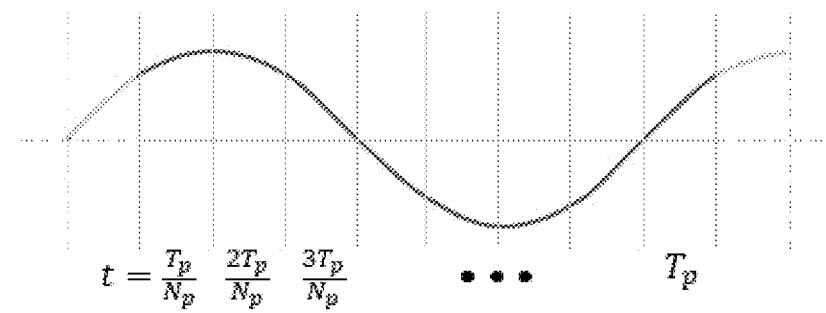
Figure 14A:
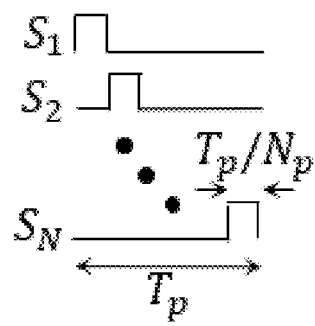
Figure 14B:
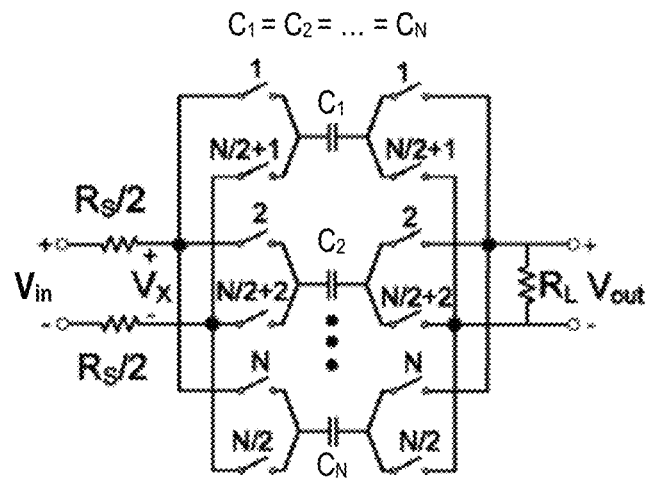
Figure 14B:
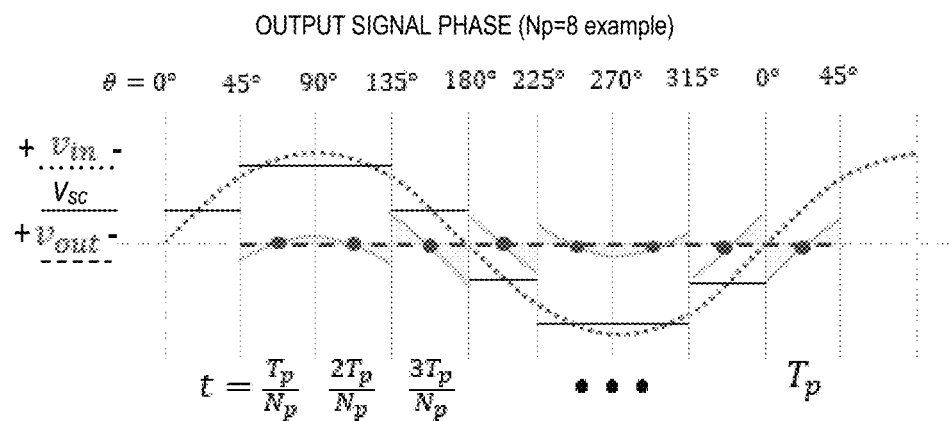
Figure 14C:
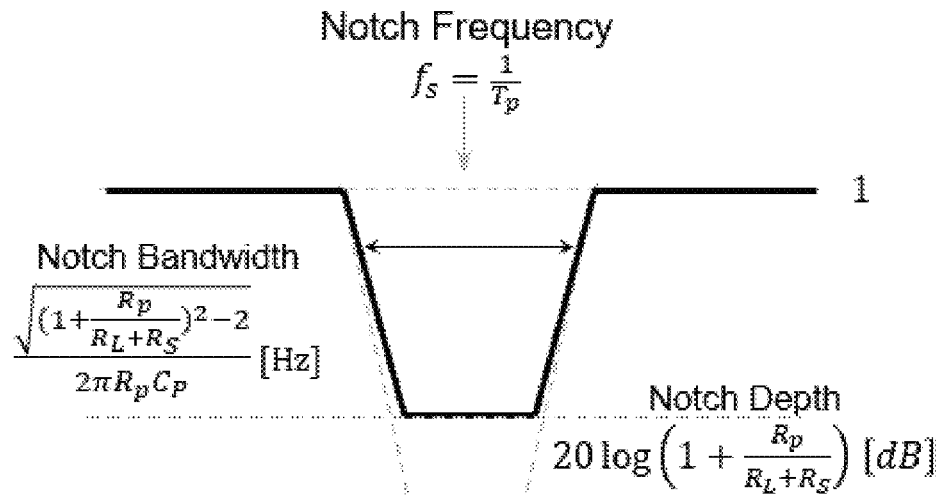
Figure 14C:
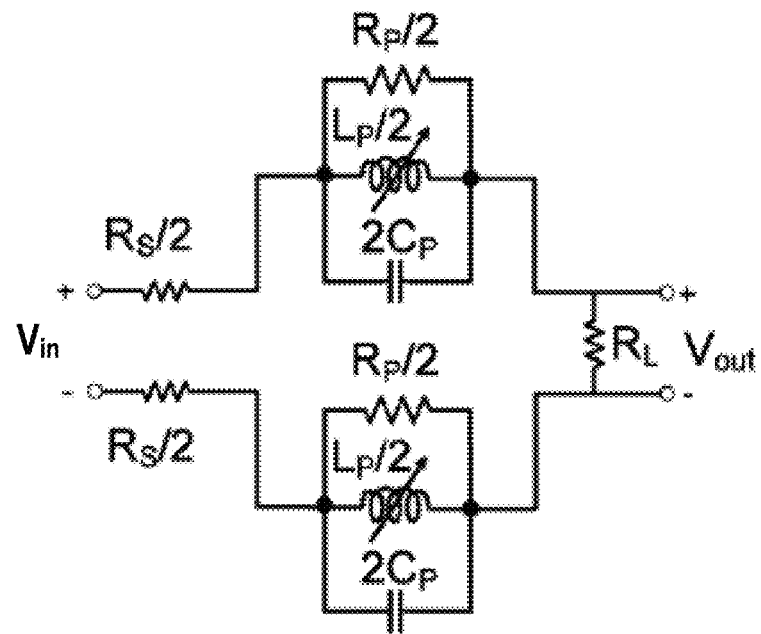
Figure 14D:
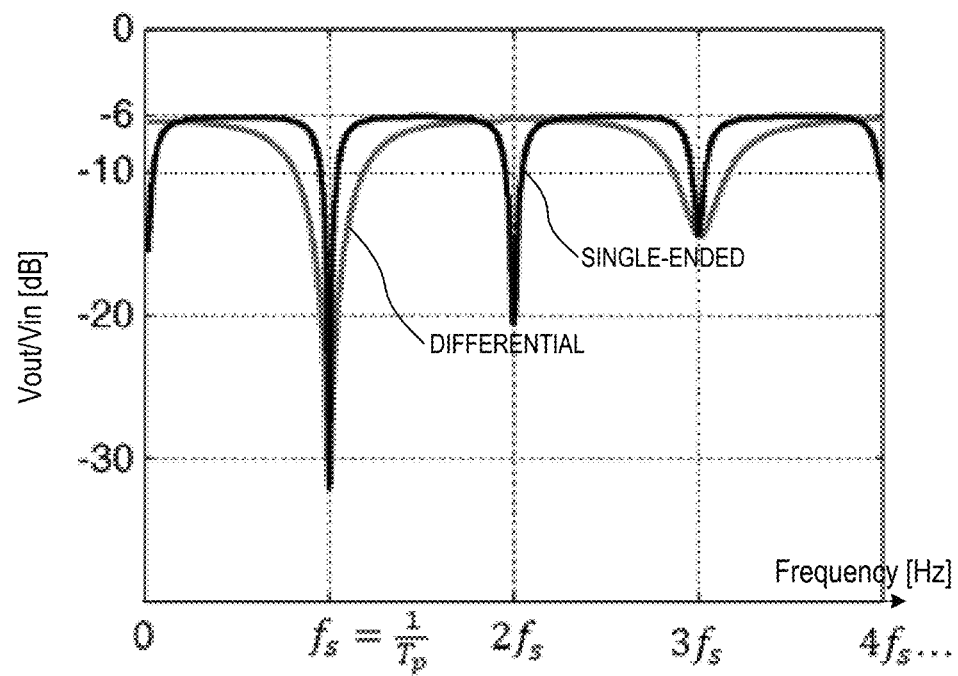

To provide additional details for an improved understanding of selected embodiments of the present disclosure, reference is now made to FIGS. 14A-D which illustrate a simplified depiction 1400A-D of the design and operation of a fully differential tunable n-path notch filter with reference to various signal waveforms and circuit schematic representations 1401-1407 of an n-path notch filter used in a receiver module path to process radar target return signals generated from a plurality of frequency and time offset modulated radar chirp signals. In the depicted example shown in FIG. 14B, the n-path notch filter 1403 is a fully differential notch filter having a plurality of Np=n paths connected to receive differential analog inputs Vin+, Vin– which are depicted with the filter input signal 1401 (shown in FIG. 14A). While any suitable filter circuit design may be used, the depicted n-path notch filter 1403 includes a pair of shared input resistors Rs/2 that represent the impedance of the source Vin, each of which is connected to receive one of the differential analog input signals Vin+, Vin– for sequential application to the Np filter paths. The depicted n-path notch filter is connected with a plurality of filter paths to generate differential filter outputs Vout+, Vout– that are connected on each end of a load resistor $R_L$. As depicted in FIG. 14B, each filter path includes first pair of input and output switches controlled by a first set of switching signals S1 (1 . . . N) for connecting a sampling capacitor Ci (i=1 . . . N) in series between one of the shared input resistors Rs/2 and a first differential filter output (e.g., Vout+). In addition, each filter path includes a second pair of input and output switches controlled by a second set of switching signals S2 which start at N/2+1 and increment to N/2+2 and on until N/2+i=N, before starting over at 1 and incrementing up to N/2. For example, for an 8-path filter, the sequence for the path clocks S1/S2 would be 1/5 for the top set of switches, and 2/6 for the second set of switches, and 3/7 for the third set of switches, and 4/8 for the fourth set of switches, and 5/1 for the fifth set of switches, and 6/2 for the sixth set of switches, and 7/3 for the seventh set of switches, and 8/4 for the eighth or bottom set of switches for connecting the sampling capacitor Ci in series between the other shared input resistor Rs/2 and the second differential filter output (e.g., +Vout−). For purposes of understanding the operational design of the n-path notch filter 1403 in implementing the first notch at frequency at Fs, the equivalent RLC filter model 1406 is depicted in FIG. 14C as first and second shared input resistors Rs/2, each respectively connected to apply one of the differential analog inputs Vin+, Vin− to a corresponding differential filter output Vout+, Vout− over a filtering circuit formed from the combined filter resistance Rp/2, filter inductance Lp2, and filter capacitance 2Cp connected in parallel between the shared input resistor Rs/2 and differential filter output Vout+, Vout−.

In operation, an input clock (not shown) having a sampling frequency $F_{CLOCK}=Fs*Np$ may be used to generate input clocking signals 1402 (shown in FIG. 14A) that are applied to control the switches $S_1$-$S_N$ in the notch filter 1403 (shown in FIG. 14B) so that they are sequentially closed over the time period Tp to connect the differential analog inputs Vin+, Vin− to a corresponding filter path. As shown with the filter input signal waveform 1401 and switching clock waveform 1402, each input clocking signal 1402 has a controlled duration Tp/Np and relative position for the filter input signal 1401 so that the corresponding filter path is connected to receive the differential analog inputs Vin+, Vin−.

Consider the example of a fully differential N-path notch filter 1403 for Np=8, the output signal phase waveform 1404 (shown in FIG. 14B) shows a typical set of node voltages for the differential input sinusoidal filter input signal −Vin+ with a frequency which matches the switching clock frequency as illustrated in 1402. In the case where the RC time constant of the notch filter is much larger than the closing time of the switches Si, the voltages on the capacitors Ci contain approximately a constant value which is the integration of the part of the input signal Vin seen periodically by each capacitor Ci. The passive mixers which are realized by the switches $S_1$-$S_N$ in the switched-capacitor n-path notch filter 1403 up-convert the DC voltages on the capacitors Ci and create a staircase approximation Vsc of the input signal Vin, as shown in the output signal waveform 1404 which depicts the staircase voltage Vsc along with the output voltage Vout=$(R_L/(R_L+R_S))(V_S-V_{SC})$ to illustrate that the notch filter 1403 provides a strong suppression of the input signal Vin at the switching frequency Fs=1/Tp. The fundamental notch response 1405 (shown in FIG. 14C) illustrates the suppression provided at the notch frequency Fs=1/Tp with a notch bandwidth and notch depth resulting from the switched-capacitor circuit and source and load resistors Rs, $R_L$ of the notch filter 1403 which provides a high impedance element for the switching frequency Fs while presenting a low impedance for the frequencies far away from the switching frequency. In addition to providing a notch characteristic at the switching frequency Fs, the fully differential n-path notch filter 1403 provides suppression of the input signal Vin at the odd-numbered harmonics of the switching frequency Fs, but not at even harmonics of the switching frequency as shown in the harmonic notch response waveform 1407 (shown in FIG. 14D) where in the differential notch filter response includes notches at the fundamental notch frequency Fs and odd numbered harmonics (3 Fs) but not at even-numbered harmonics (e.g., 2 Fs, 4 Fs).

As seen from the foregoing, the differential n-path notch filter 1403 includes input signal suppression at odd-numbered harmonics of the switching frequency. To provide notch filtering at the even-numbered harmonics, the notch filter may be constructed with multiple filter sections, each having different numbers of paths but clocked by the same input clock frequency to obtain the desired combined notch filter performance. For example, a first differential notch filter section may be constructed as a 16-path differential notch filter that is clocked with a sampling clock at $F_{CLOCK}$=640 MHz to generate notches at the fundamental notch frequency 40 MHz and at the third order harmonic frequency 120 MHz. In addition, a second differential notch filter section may be constructed as an 8-path differential notch filter that is clocked with the same sampling clock at $F_{CLOCK}$=640 MHz to generate a notch at the fundamental notch frequency 80 MHz. Combining the first and second differential notch filter sections in series produces a tunable notch filter having notches at four notch frequencies (e.g., DC or 0 MHz, 40 MHz, 80 MHz and 120 MHz). As a result, there is disclosed herein the beneficial use of harmonic notches generated by multiple differential n-path notch filters connected in series to suppress spill-over interference effects from multi-transmitter FanTOM chirp radar systems. There is also disclosed the beneficial use of controlling the input clock sampling frequency Fs by adjusting $F_{CLOCK}$ and the number of paths in multiple differential n-path notch filters to adjust the frequency locations of the filter notches, thereby tuning the filter performance. In embodiments where the number of paths $N_{PATH}$ in each notch filter section meets or exceeds the number of transmit antennas in a FanTOM radar system, there is provided an efficient way to set up and coordinate the required frequency responses and sample rates between the required anti-aliasing filter (AAF), the n-path notch filter, and the analog-to-digital converter (ADC) for a single-ended or fully differential receiver line up, where the n-path notch filter and ADC may be clocked with the same sampling clock $F_{CLOCK}$ and where the corner frequency of the AAF may be to a predetermined fraction of the sampling frequency (e.g., $F_{CLOCK}/4$) so that the AAF can sufficiently attenuate any potentially interfering signals before they are sampled.

Figure 15:
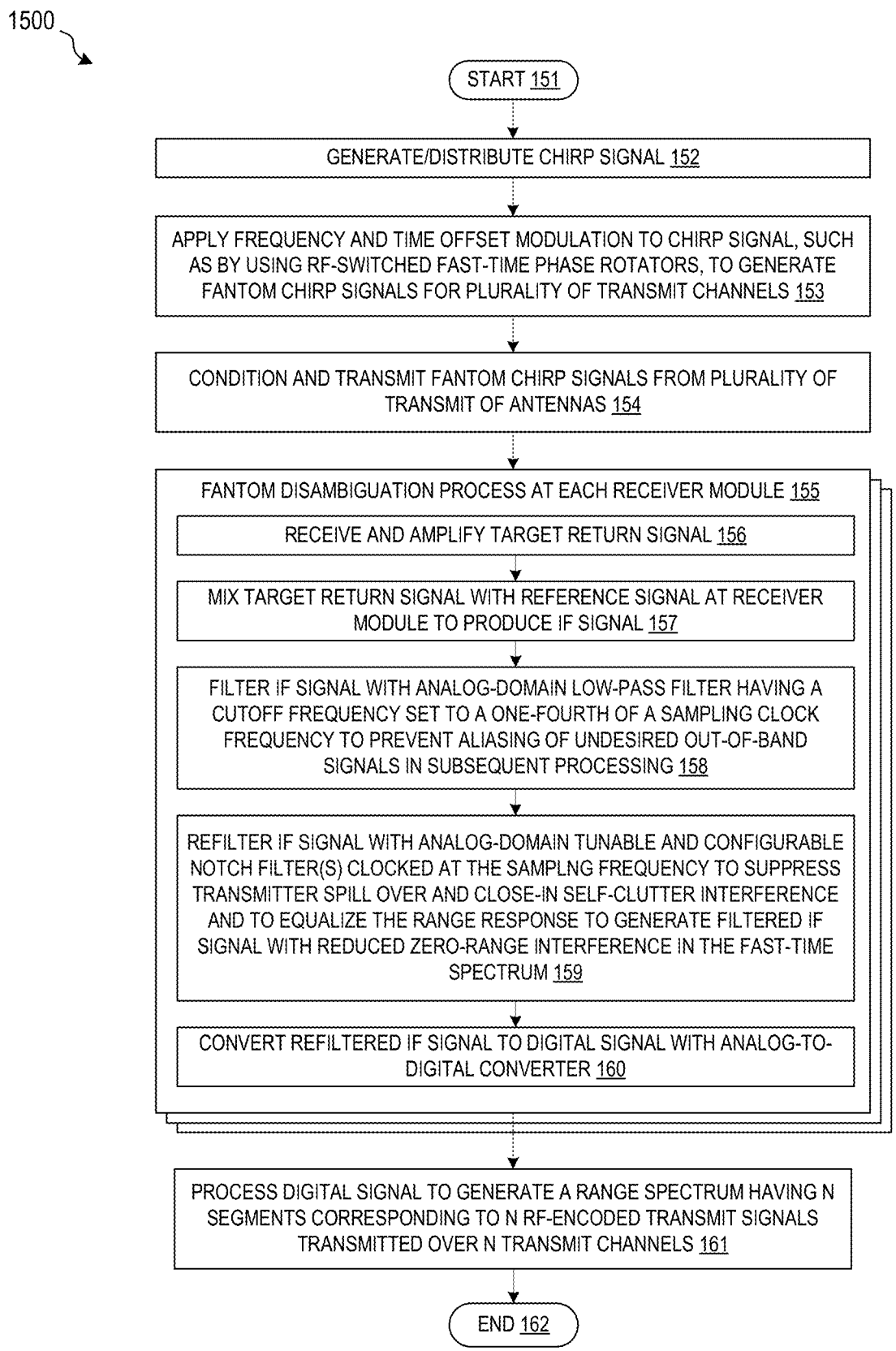
FIG. 15 illustrates a simplified flow chart showing the logic for operating a FanTOM chirp radar system having a tunable anti-aliasing filter, n-path notch filter, and analog-to-digital converter with frequency responses and sample rates that are configured for a receiver line up.

To provide additional details for an improved understanding of selected embodiments of the present disclosure, reference is now made to FIG. 15 which depicts a simplified flow chart 1500 showing the logic for operating a FanTOM chirp radar system having a tunable anti-aliasing filter, n-path notch filter, and analog-to-digital converter with frequency responses and sample rates that are configured for a receiver line up. In an example embodiment, the control logic and methodology shown in FIG. 15 may be implemented as hardware and/or software on a host computing system, processor, or microcontroller unit that includes processor and memory for storing programming control code for constructing and operating a large virtual MIMO radar arrays by introducing frequency and time offset modulations signals to reference chirp signals to enable separation of the transmitter signals in the range spectrum to enable construction of very large MIM virtual arrays.

The process starts (step 151), such as when the radar system begins the process of sensing the location and movement of one or more target objects using one or more transmit radar signals that are sent over a plurality of transmit antennas. To generate the transmit radar signals, the radar system first generates a reference chirp signal (step 152), such as by periodically modulating a transmit radar signal with a frequency and/or phase shift. For example, with automotive Frequency Modulation Continuous Wave (FMCW) radars, the reference chirp signal may be generated as a Linear Frequency Modulation (LFM) waveform that is distributed to a plurality of transmit channel circuits which are respectively associated with a plurality of transmit antennas.

At step 153, frequency and time offset modulation is applied to the reference chirp signal received at each transmit path using any suitable transmit processing circuits. For example, each transmit path may include a plurality of RF-switched fast-time phase rotators which are connected to receive the reference chirp signal and to generate a corresponding plurality of FanTOM chirp signals for the plurality of transmit channels under control of respective control/switching signals, each FanTOM chirp signal having a different frequency offset (e.g., 0, $-f_A$, $-(N-1)f_A$) and time offset (e.g., 0, $\Delta t$, $2\Delta t$, $3\Delta t$) from the reference chirp signal. In such embodiments, a plurality of fast-time phase rotators may be connected to receive the reference chirp signal and to generate therefrom the frequency offset chirp signals having a different frequency offset (e.g., 0, $-f_A$, $-(N-1)f_A$) from the reference chirp signal. In addition, a plurality of RF switches may be connected to receive the frequency offset chirp signals and to generate the plurality of FanTOM chirp signals, where the RF switches are controlled to insert a predetermined time delay (e.g., $\Delta t$) between the frequency offset chirp signals transmitted by transmit antennas during a single pulse repetition interval (PRI). In other embodiments, an offset-frequency linear chirp generator is provided to generate a plurality of frequency offset chirp signals having a different frequency offset (e.g., 0, $-f_A$, $-(N-1)f_A$) from a reference chirp signal, where the plurality of frequency offset chirp signals is provided to a plurality of RF switches for generating the plurality of FanTOM chirp signals by controlling the RF switches to insert a predetermined time delay (e.g., $\Delta t$) between the frequency offset chirp signals transmitted by transmit antennas during a single pulse repetition interval (PRI). While one of the transmit channel circuits may be connected to directly transmit the reference chirp signal without any frequency or time offset modulation, in other embodiments, each transmit channel circuit may impose frequency and time offset modulation on a received reference chirp signal before transmission.

At step 154, the FanTOM chirp signals are conditioned and amplified for transmission over the corresponding transmit channel circuits. In selected embodiments, this processing is performed by the transmit channel circuits which each includes an RF conditioning module (which may include filtering, leveling, applying additional phase coding, or applying RF switching, of the output of the corresponding phase shifter) and power amplifier (which amplifies the RF conditioning module output for transmission over a corresponding transmit antenna).

At step 155, analog processing is applied to separate the reflected transmit channel signals from each transmitter using FanTOM disambiguation signal processing steps at each receiver module. As indicated by the cascaded boxes 155, the analog processing is performed separately at each receiver module. While any suitable FanTOM disambiguation signal processing steps may be used at step 155, in selected embodiments, the processing may start at step 156 when the target return signals are reflected from the target are received, conditioned, and amplified at the receiver module. In selected embodiments, one or more receive antennas at the receiver module receive target returns from the transmitted FanTOM coded chirp signal waveforms as (radio frequency) antenna signals for subsequent amplification, such as by using a low noise amplifier to generate an amplified RF signal from the target returns. In addition, the amplified RF signal is mixed with the reference chirp signal at the receiver to generate an intermediate frequency (IF) signal at step 157. In selected embodiments, the mixing step 157 may be implemented by applying the reference chirp signal to a receiver module mixer which is also connected to receive the received target signals for mixing with the reference chirp signal, thereby generating an intermediate frequency (IF) signal. Subsequently, the mixer output IF signal may be amplified with a variable gain amplifier before being processed at step 158 to filter the amplified IF signal with an analog-domain low pass filter having cut-off frequency set to one-fourth of a sampling clock frequency $F_{CLOCK}$ to prevent aliasing of undesired out-of-band signals in subsequent processing. In selected embodiments, the IF signal filtering step 158 may be implemented with a tunable anti-aliasing low-pass filter having its cut-off frequency set to $F_{CLOCK}/4$. Subsequently, the IF signal may be filtered at step 159 with one or more analog-domain tunable and configurable notch filters to suppress transmitter spill over and close-in self-clutter interference and to equalize the range response, thereby generating a re-filtered IF signal with reduced zero-range interference in the fast-time spectrum. In selected embodiments, the IF filtering process at step 159 may use one or more n-path notch filters, where the number of paths in each filter meets or exceeds the number of transmitters. In addition, the one or more n-path notch filters used in the IF filtering process at step 159 may each be clocked at the sampling clock frequency $F_{CLOCK}$ which may be tuned to adjust the frequencies of the filter notches which suppress the input IF signal to the notch filter(s). By controlling the number of paths in each notch filter and the sampling clock frequency $F_{CLOCK}$, the filter notches frequencies of the notch filter are able to filter out the zero-range interference in the fast-time spectrum of each transmitter. A final analog processing step may be to convert the re-filtered IF signal to a digital signal with an analog-to-digital converter at step 160. In selected embodiments, the ADC processing step 160 may be performed by feeding the refiltered IF signal fed to a high-speed analog/digital converter (ADC) which is clocked at the sampling clock frequency $F_{CLOCK}$ to generate a digital signal output that is suitable for digital processing.

At step 161, digital processing is applied to separate the reflected transmit channel signals for each transmitter by generating a range spectrum having N segments corresponding, respectively, to N RF-encoded transmit signals transmitted over N transmit channels. While any suitable digital signal processing steps may be used, in selected embodiments, the processing may start at step 161 by processing the spectrum of the raw ADC samples with by radar processor 485 which uses a fast Fourier transform engine to extract the target range information. The radar processor can also perform a variety of tasks in extracting the target range information. For example, extracting the range spectrum of each of the N transmitters from a range spectrum of the N radio frequency encoded transmit signals may include forming a Doppler spectrum for each range spectrum (over multiple transmit cycles), and then performing detection of the target return signal in each Doppler spectrum transmitter/receiver pair, and then forming a range-division MIMO virtual antenna measurement vector from the detected target return signals, and then generating a target angle using the formed range-division MIMO virtual antenna measurement vectors. In addition, the output of the radar processor can be fed to other vehicular control and processing systems via a data interface and networking systems (not shown). And step 162, the method for operating the FanTOM chirp radar system ends.

By now it should be appreciated that there has been provided a radar system, apparatus, architecture, and associated method of operation. In the disclosed methodology, a reference signal which includes a sequence of waveforms is generated at a transmitter module, such as by generating a linear frequency modulation (LFM) reference chirp signal. In addition, the disclosed methodology includes generating a plurality of frequency and time offset modulation signals from the reference signal for a corresponding plurality of N transmitters of the radar system, wherein each transmitter is associated with a distinct frequency and time offset modulation signal. The disclosed methodology also includes transmitting the plurality of frequency and time offset modulation signals as N radio-frequency encoded transmit signals from the N transmitters at the radar system. At a receiver module at the radar system, a receiving antenna receives a target return signal reflected from the N radio-frequency encoded transmit signals, and then mixes the target return signal with the reference signal to produce an intermediate frequency signal. The receiver module also filters the intermediate frequency signal with a bank of one or more notch filters to produce a filtered intermediate frequency signal, where the bank of one or more notch filters is clocked with a sampling clock frequency $F_{CLOCK}$ to control harmonic notch frequencies to suppress transmitter spill-over and close-in self-clutter interference. In selected embodiments, a single-ended intermediate frequency signal from the mixer is filtered with a multi-path notch filter which includes a plurality of at least N switched capacitor paths where N is the number of transmitters in the radar system. For example, the multi-path notch filter may include 4N switched capacitor paths and the sampling clock frequency $F_{CLOCK}$ is a product of 4N and a frequency offset value Δf used to generate the plurality of frequency and time offset signals. In other embodiments, a fully differential intermediate frequency signal from the mixer is filtered with first and second multi-path notch filters connected in series to produce the filtered intermediate frequency signal, where the first multi-path notch filter includes a first plurality of at least 4N switched capacitor paths clocked with the sampling clock frequency $F_{CLOCK}$ and where the second multi-path notch filter includes a second plurality of at least 2N switched capacitor paths clocked with the sampling clock frequency $F_{CLOCK}$. For example, the first multi-path notch filter may include 4N switched capacitor paths and the second multi-path notch filter may include 2N switched capacitor paths. In addition, the filtered intermediate frequency is converted to a digital signal with an analog-to-digital converter at the receiver module that is clocked with a sampling clock frequency of at least $F_{CLOCK}$. In selected embodiments, the intermediate frequency signal from the mixer is filtered at the receiver module with a tunable anti-aliasing low-pass filter prior to notch filtering to remove interfering signals before being sampled and aliased by the n-path filter and/or analog-to-digital converter, where the tunable anti-aliasing low-pass filter has a corner frequency set at one-fourth of the sampling clock frequency $F_{CLOCK}$. Finally, the digital signal is processed to generate a range spectrum comprising N segments that correspond, respectively, to the N radio frequency encoded transmit signals transmitted over the N transmitters.

In another form, there is provided a radar system, apparatus, architecture, and associated method of operation. As disclosed, the radar system includes a reference signal generator configured to produce a reference signal comprising a sequence of waveforms, a transmit module, a first receiver module, and a radar control processing unit. In selected embodiments, the reference signal generator generates a linear frequency modulation (LFM) reference chirp signal. The disclosed transmit module is connected and configured to produce a plurality of frequency and time offset modulation (FanTOM) signals from the reference signal and to transmit the plurality of FanTOM signals as N radio-frequency encoded transmit signals over a corresponding plurality of N transmitters, wherein each transmitter is configured to transmit an associated FanTOM signal at a distinct time. In selected embodiments, the transmit module includes a plurality of transmit paths, each including a high-speed phase rotator connected to generate a frequency offset signal that is frequency shifted from the reference signal by an integer multiple of a frequency offset value Δf; a radio frequency switch connected to generate a frequency and time offset modulation signal from the frequency offset signal; and a signal encoder to encode the frequency and time offset modulation signal using signal conditioning and power amplification to produce and transmit one of the N radio-frequency encoded transmit signals over one of the N transmitters. In other embodiments, the reference signal generator generates a plurality of frequency offset signals which are each frequency shifted from a linear frequency modulation (LFM) reference chirp signal by an integer multiple of a frequency offset value Δf. In such embodiments, the transmit module may include a plurality of transmit paths connected, respectively, to the plurality of frequency offset signals, where each transmit paths includes a radio frequency switch connected to generate a frequency and time offset modulation signal from a received frequency offset signal; and a signal encoder to encode the frequency and time offset modulation signal using signal conditioning and power amplification to produce and transmit one of the N radio-frequency encoded transmit signals over one of the N transmitters. In addition, a disclosed first receiver module includes a first receive antenna configured to receive a target return signal reflected from the N radio-frequency encoded transmit signals by at least one target, the first receiver module. The disclosed first receiver module also includes a mixer circuit configured to mix the target return signal with the reference signal to produce an intermediate frequency signal. In addition, the disclosed first receiver module includes a bank of one or more notch filters configured to produce a filtered intermediate frequency signal from the intermediate frequency signal, where the bank of one or more notch filters is clocked with a sampling clock frequency $F_{CLOCK}$ to control harmonic notch frequencies which suppress transmitter spill-over and close-in self-clutter interference. In selected embodiments, the bank of one or more notch filters includes an n-path notch filter configured to filter a single-ended intermediate frequency signal from the mixer circuit, where the n-path notch filter is characterized by a plurality of notches to suppress transmitter spill-over at a plurality of specified harmonic notch frequencies specified with integer multiples of a frequency offset value Δf used to generate the plurality of frequency and time offset signals. In such embodiments, the n-path notch filter may include at least 4N switched capacitor paths and where the sampling clock frequency $F_{CLOCK}$ is a product of 4N and a frequency offset value Δf used to generate the plurality of frequency and time offset signals. In other embodiments, the bank of one or more notch filters includes first and second multi-path notch filters. In such embodiments, the first multi-path notch filter is configured to generate a first filter signal by filtering a fully differential intermediate frequency signal from the mixer circuit, where the first multi-path notch filter is characterized by a plurality of notches to suppress transmitter spill-over at a plurality of specified harmonic notch frequencies specified with odd-numbered integer multiples of a frequency offset value $\Delta f$ used to generate the plurality of frequency and time offset signals. In addition, the second multi-path notch filter is configured to generate the filtered intermediate frequency signal by filtering the first filter signal, where the second multi-path notch filter is characterized by a plurality of notches to suppress transmitter spill-over at a plurality of specified harmonic notch frequencies specified with odd-numbered integer multiples of the frequency offset value $\Delta f$. In such embodiments, the first multi-path notch filter may include 4N switched capacitor paths and the second multi-path notch filter may include 2N switched capacitor paths. In addition, the disclosed first receiver module includes an analog-to-digital converter configured to converting the filtered intermediate frequency to a digital signal, where the analog-to-digital converter is clocked with a sampling clock frequency of at least $F_{CLOCK}$. In selected embodiments, the first receiver module also includes a tunable anti-aliasing low-pass filter configured to filter the intermediate frequency signal from the mixer circuit to remove potentially interfering signals before being sampled by the bank of one or more notch filters and/or analog-to-digital converter, where the tunable anti-aliasing low-pass filter has a corner frequency set at one-fourth of the sampling clock frequency $F_{CLOCK}$. The disclosed radar control processing unit is configured to process the digital signal to generate a range spectrum comprising N segments that correspond, respectively, to the N radio frequency encoded transmit signals transmitted over the N transmitters.

In yet another form, there is provided a radar system, apparatus, architecture, and associated method of operation. As disclosed, the radar system includes a plurality of transmitters, a plurality of receivers, and a radar control processing unit. Each of the disclosed transmitters is configured to receive a linear frequency modulation (LFM) reference chirp signal. Each disclosed transmitter is also configured to generate a frequency offset signal from the reference signal, wherein each transmitter of the plurality of transmitters is associated with a distinct frequency offset from the LFM reference chirp signal. In addition, each disclosed transmitter is configured to transmit the frequency offset signal as a RF encoded transmit signal at a distinct time for that transmitter, wherein the difference in the starting time of the transmission for each transmitter is at least equivalent to a round trip delay associated with a predetermined maximum range of the radar system. Each of the disclosed receivers is configured to receive, at an antenna, a target return signal reflected from the RF encoded transmit signals associated with the plurality of transmitters. Each disclosed receiver is also configured to mix the target return signal with the LFM reference chirp signal to produce an intermediate frequency signal. In addition, each disclosed receiver is configured to filter the intermediate frequency signal with at least a bank of one or more multi-path notch filters configured to produce a filtered intermediate frequency signal from the intermediate frequency signal, where the bank of one or more multi-path notch filters is clocked with a sampling clock frequency $F_{CLOCK}$ to control harmonic notch frequencies which suppress transmitter spill-over and close-in self-clutter interference. In addition, each disclosed receiver is configured to convert the filtered intermediate frequency signal to a digital signal with an analog-to-digital converter clocked with a sampling clock frequency of at least $F_{CLOCK}$. In selected embodiments, the bank of one or more multi-path notch filters and the analog-to-digital converter are both clocked with the sampling clock frequency $F_{CLOCK}$. In selected embodiments, each disclosed receiver is also configured to filter the digital signal generated by the analog-to-digital converter with a digital decimation filter to lower an output rate of the analog-to-digital converter. In selected embodiments, each disclosed receiver is also configured to filter the intermediate frequency signal with a tunable anti-aliasing low-pass filter to remove potentially interfering signals before being sampled by the bank of one or more multi-path notch filters and/or analog-to-digital converter, where the tunable anti-aliasing low-pass filter has a corner frequency set at one-fourth of the sampling clock frequency $F_{CLOCK}$. The disclosed radar control processing unit configured to process the digital signal to generate a range spectrum comprising a first plurality of segments that correspond, respectively, to the RF encoded transmit signals by the plurality of transmitters.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Although the invention is described herein with reference to specific embodiments, various modifications and changes can be made without departing from the scope of the present invention as set forth in the claims below. For example, differing numbers of transmitters and receivers can be changed according to the application. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. In addition, the term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for operating a radar system, comprising:
    generating a reference signal comprising a sequence of waveforms at a transmitter module;
    generating a plurality of frequency and time offset modulation signals from the reference signal for a corresponding plurality of N transmitters of the radar system, wherein each transmitter is associated with a distinct frequency and time offset modulation signal;
    transmitting the plurality of frequency and time offset modulation signals as N radio-frequency encoded transmit signals from the N transmitters at the radar system;
    receiving, at a receiving antenna of a receiver module at the radar system, a target return signal reflected from the N radio-frequency encoded transmit signals;
    mixing the target return signal with the reference signal at the receiver module to produce an intermediate frequency signal;
    filtering the intermediate frequency signal with a bank of one or more notch filters to produce a filtered intermediate frequency signal, where the bank of one or more notch filters is clocked with a sampling clock frequency $F_{CLOCK}$ to control harmonic notch frequencies of the bank of one or more notch filters;
    converting the filtered intermediate frequency to a digital signal with an analog-to-digital converter at the receiver module that is clocked with a sampling clock frequency of at least $F_{CLOCK}$; and
    processing the digital signal to generate a range spectrum comprising N segments that correspond, respectively, to the N radio frequency encoded transmit signals transmitted over the N transmitters.

2. The method of claim 1, wherein generating the reference signal comprises generating a linear frequency modulation (LFM) reference chirp signal.

3. The method of claim 1, further comprising filtering the intermediate frequency signal from the mixer with a tunable anti-aliasing low-pass filter at the receiver module to remove potentially interfering signals before being sampled by the bank of one or more notch filters or analog-to-digital converter, where the tunable anti-aliasing low-pass filter has a corner frequency set at one-fourth of the sampling clock frequency $F_{CLOCK}$.

4. The method of claim 1, where filtering the intermediate frequency signal comprises filtering a single-ended intermediate frequency signal from the mixer with an n-path notch filter characterized by a plurality of notches to suppress transmitter spill-over and close-in interference at a plurality of specified harmonic notch frequencies specified with integer multiples of a frequency offset value $\Delta f$ used to generate the plurality of frequency and time offset signals.

5. The method of claim 4, where the n-path notch filter comprises at least 4N switched capacitor paths and where the sampling clock frequency $F_{CLOCK}$ is a product of 4N and a frequency offset value $\Delta f$ used to generate the plurality of frequency and time offset signals.

6. The method of claim 1, where filtering the intermediate frequency signal comprises:
    filtering a fully differential intermediate frequency signal from the mixer with a first n-path notch filter configured to generate a first filter signal, where the first n-path notch filter is characterized by a plurality of notches to suppress transmitter spill-over and close-in interference at a plurality of specified harmonic notch frequencies specified with odd-numbered integer multiples of a frequency offset value $\Delta f$ used to generate the plurality of frequency and time offset signals; and
    filtering the first filtered signal with a second n-path notch filter configured to generate the filtered intermediate frequency signal, where the second n-path notch filter is characterized by a plurality of notches to suppress transmitter spill-over at a plurality of specified harmonic notch frequencies specified with odd-numbered integer multiples of the frequency offset value $\Delta f$.

7. The method of claim 6, where the first n-path notch filter comprises 4N switched capacitor paths and where the second n-path notch filter comprises 2N switched capacitor paths.

8. A radar system, comprising:
    a reference signal generator configured to produce a reference signal comprising a sequence of waveforms;
    a transmit module configured to produce a plurality of frequency and time offset modulation (FanTOM) signals from the reference signal and to transmit the plurality of FanTOM signals as N radio-frequency encoded transmit signals over a corresponding plurality of N transmitters, wherein each transmitter is configured to transmit an associated FanTOM signal at a distinct time;

at least a first receiver module, comprising:
  a first receive antenna configured to receive a target return signal reflected from the N radio-frequency encoded transmit signals by at least one target,
  a mixer circuit configured to mix the target return signal with the reference signal to produce an intermediate frequency signal,
  a bank of one or more notch filters configured to produce a filtered intermediate frequency signal from the intermediate frequency signal, where the bank of one or more notch filters is clocked with a sampling clock frequency $F_{CLOCK}$ to control harmonic notch frequencies of the bank of one or more notch filters, and
  an analog-to-digital converter configured to convert the filtered intermediate frequency to a digital signal, where the analog-to-digital converter is clocked with a sampling clock frequency of at least $F_{CLOCK}$; and
a radar control processing unit configured to process the digital signal to generate a range spectrum comprising N segments that correspond, respectively, to the N radio frequency encoded transmit signals transmitted over the N transmitters.

9. The radar system of claim 8, wherein the reference signal generator generates a linear frequency modulation (LFM) reference chirp signal.

10. The radar system of claim 8, where the transmit module comprises a plurality of transmit paths, each comprising:
  a high-speed phase rotator connected to generate a frequency offset signal that is frequency shifted from the reference signal by an integer multiple of a frequency offset value $\Delta f$;
  a radio frequency switch connected to generate a frequency and time offset modulation signal from the frequency offset signal; and
  a signal encoder to encode the frequency and time offset modulation signal using signal conditioning and power amplification to produce and transmit one of the N radio-frequency encoded transmit signals over one of the N transmitters.

11. The radar system of claim 8, wherein the reference signal generator generates a plurality of frequency offset signals which are each frequency shifted from a linear frequency modulation (LFM) reference chirp signal by an integer multiple of a frequency offset value $\Delta f$.

12. The radar system of claim 11, where the transmit module comprises a plurality of transmit paths connected, respectively, to the plurality of frequency offset signals, where each transmit paths comprises:
  a radio frequency switch connected to generate a frequency and time offset modulation signal from a received frequency offset signal; and
  a signal encoder to encode the frequency and time offset modulation signal using signal conditioning and power amplification to produce and transmit one of the N radio-frequency encoded transmit signals over one of the N transmitters.

13. The radar system of claim 8, where the first receiver module further comprises a tunable anti-aliasing low-pass filter configured to filter the intermediate frequency signal from the mixer circuit to remove potentially interfering signals before being sampled by the bank of one or more notch filters or analog-to-digital converter, where the tunable anti-aliasing low-pass filter has a corner frequency set at one-fourth of the sampling clock frequency $F_{CLOCK}$.

14. The radar system of claim 8, where the bank of one or more notch filters comprises an n-path notch filter configured to filter a single-ended intermediate frequency signal from the mixer circuit, where the n-path notch filter is characterized by a plurality of notches to suppress transmitter spill-over and close-in interference at a plurality of specified harmonic notch frequencies specified with integer multiples of a frequency offset value $\Delta f$ used to generate the plurality of frequency and time offset signals.

15. The radar system of claim 14, where the n-path notch filter comprises at least 4N switched capacitor paths and where the sampling clock frequency $F_{CLOCK}$ is a product of 4N and a frequency offset value $\Delta f$ used to generate the plurality of frequency and time offset signals.

16. The radar system of claim 8, where the bank of one or more notch filters comprises:
  a first multi-path notch filter configured to generate a first filter signal by filtering a fully differential intermediate frequency signal from the mixer circuit, where the first multi-path notch filter is characterized by a plurality of notches to suppress transmitter spill-over at a plurality of specified harmonic notch frequencies specified with odd-numbered integer multiples of a frequency offset value $\Delta f$ used to generate the plurality of frequency and time offset signals; and
  a second multi-path notch filter configured to generate the filtered intermediate frequency signal by filtering the first filter signal, where the second multi-path notch filter is characterized by a plurality of notches to suppress transmitter spill-over at a plurality of specified harmonic notch frequencies specified with odd-numbered integer multiples of the frequency offset value $\Delta f$.

17. The radar system of claim 16, where the first multi-path notch filter comprises 4N switched capacitor paths and where the second multi-path notch filter comprises 2N switched capacitor paths.

18. A radar system comprising:
  a plurality of transmitters, wherein each transmitter is configured to:
  receive a linear frequency modulation (LFM) reference chirp signal,
  generate a frequency offset signal from the reference signal, wherein each transmitter of the plurality of transmitters is associated with a distinct frequency offset from the LFM reference chirp signal, and
  transmit the frequency offset signal as a RF encoded transmit signal at a distinct time for that transmitter, wherein the difference in the starting time of the transmission for each transmitter is at least equivalent to a round trip delay associated with a predetermined maximum range of the radar system;
  a plurality of receivers, wherein each receiver is configured to:
  receive, at an antenna, a target return signal reflected from the RF encoded transmit signals associated with the plurality of transmitters,
  mix the target return signal with the LFM reference chirp signal to produce an intermediate frequency signal,
  filter the intermediate frequency signal with at least a bank of one or more multi-path notch filters configured to produce a filtered intermediate frequency signal from the intermediate frequency signal, where the bank of one or more multi-path notch filters is clocked with a sampling clock frequency $F_{CLOCK}$ to control harmonic notch frequencies which suppress transmitter spill-over and close-in self-clutter interference, and convert the filtered intermediate frequency signal to a digital signal with an analog-to-digital converter clocked with a sampling clock frequency of at least $F_{CLOCK}$; and a radar control processing unit configured to process the digital signal to generate a range spectrum comprising a first plurality of segments that correspond, respectively, to the RF encoded transmit signals by the plurality of transmitters.

19. The radar system of claim 18, wherein each receiver is configured to filter the intermediate frequency signal with a tunable anti-aliasing low-pass filter to remove potentially interfering signals before being sampled by the bank of one or more multi-path notch filters or analog-to-digital converter, where the tunable anti-aliasing low-pass filter has a corner frequency set at one-fourth of the sampling clock frequency $F_{CLOCK}$.

20. The radar system of claim 18, where each transmitter comprises:

a high-speed phase rotator connected to generate a frequency offset signal that is frequency shifted from the LFM reference chirp signal by an integer multiple of a frequency offset value $\Delta f$;

a radio frequency switch connected to generate a frequency and time offset modulation signal from the frequency offset signal; and a signal encoder to encode the frequency and time offset modulation signal using signal conditioning and power amplification to produce and transmit a radio-frequency encoded transmit signal over a transmit antenna.

* * * * *